US005537318A

United States Patent [19]
Moses et al.

[11] Patent Number: 5,537,318
[45] Date of Patent: Jul. 16, 1996

[54] LIGHTNING STRIKE DETECTION AND MAPPING SYSTEM

[75] Inventors: Randolph L. Moses, Worthington; Joseph G. Kuzma, Dublin; Kenneth A. Ostrander, Columbus; Billie M. Stevens, Jr., Westerville, all of Ohio

[73] Assignee: B. F. Goodrich FlightSystems, Inc., Columbus, Ohio

[21] Appl. No.: 274,924

[22] Filed: Jul. 13, 1994

[51] Int. Cl.⁶ .................................................. G06F 169/00
[52] U.S. Cl. ........................................ 364/420; 324/76.21
[58] Field of Search ................................ 364/420; 324/72, 324/76.15, 76.21, 76.22; 342/460

[56] References Cited

U.S. PATENT DOCUMENTS

| | | | |
|---|---|---|---|
| 4,023,408 | 5/1977 | Ryan et al. | 73/170 |
| 4,115,732 | 9/1978 | Krider et al. | 324/72 |
| 4,198,599 | 4/1980 | Krider et al. | 324/72 |
| 4,672,305 | 6/1987 | Coleman | 324/72 |
| 4,803,421 | 2/1989 | Ostrander | 324/72 |
| 5,153,508 | 10/1992 | Blakeslee et al. | 324/72 |
| 5,245,274 | 9/1993 | Youngquist | 324/72 |
| 5,295,071 | 3/1994 | Kuzma et al. | 364/420 |
| 5,295,072 | 3/1994 | Stevens, Jr. et al. | 364/420 |

OTHER PUBLICATIONS

Hans Volland, "CRC Handbook of Atmospherics," vol. 1, pp. 190–199.
B. M. Stevens, Jr. et al., "A Lightning Data Acquisition System," Jun. 24–26, 1986, International Aerospace and Ground Conference on Lightning and Static Electricity, Dayton, Ohio.

*Primary Examiner*—Donald E. McElheny, Jr.
*Attorney, Agent, or Firm*—Mark D. Saralino; William E. Zitelli

[57] ABSTRACT

A lightning strike detection and mapping system which determines the range and bearing of each valid lightning strike by (1) computing the Fourier Transform, and more preferably the discrete Fourier Transform (DFT) of the X and Y waveforms, classifying the lighting strike based on the DFTs, and estimating the range of the lightning strike based on a type-dependent weighted sum of the DFT coefficients; (2) detecting whether the X or Y waveform is a doublet waveform and classifying the lightning strike based on the detection of a doublet; (3) performing range correction based on type classification and tail activity; and (4) reconstructing clipped waveforms in order to extend the dynamic range of the system.

53 Claims, 21 Drawing Sheets

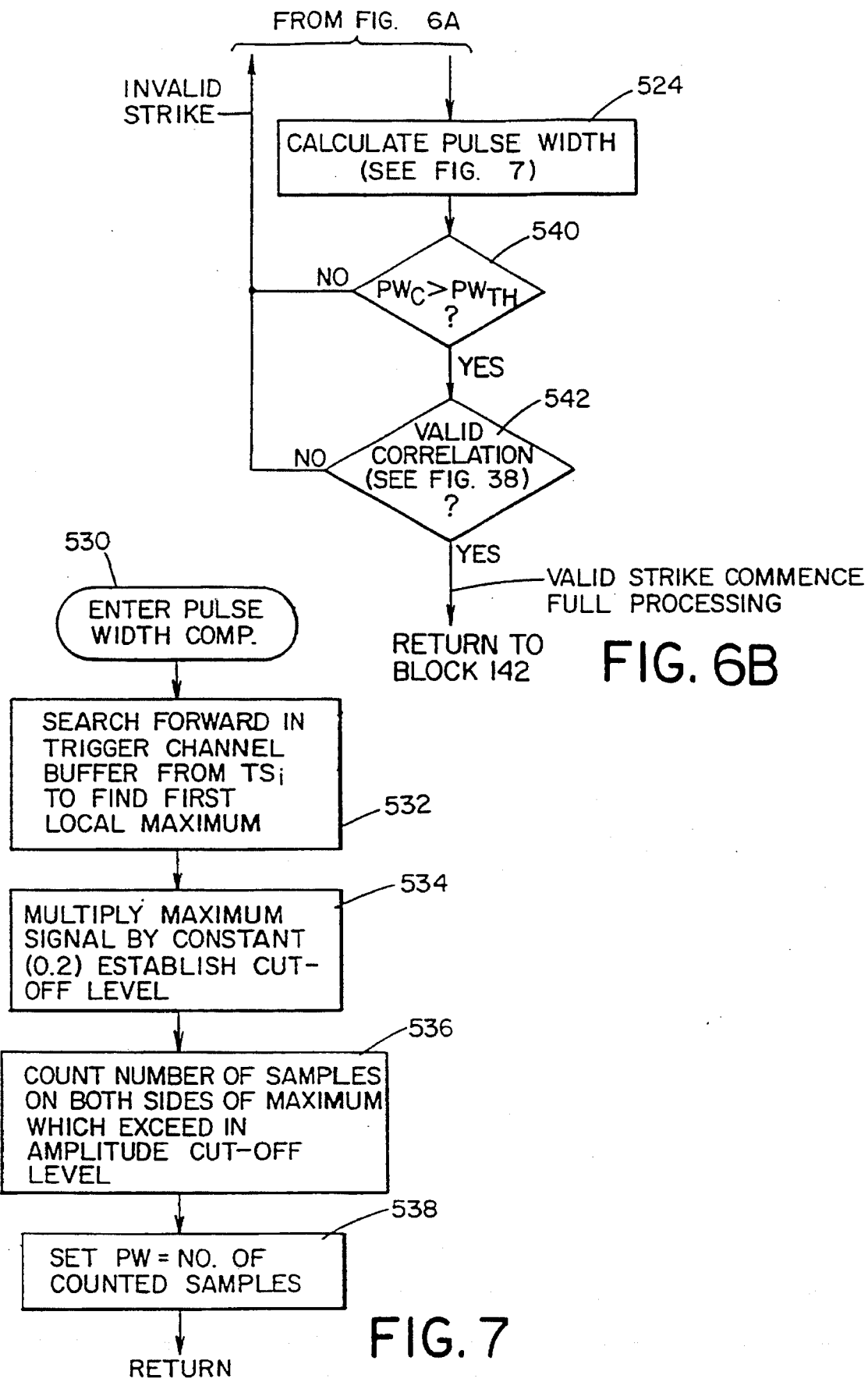

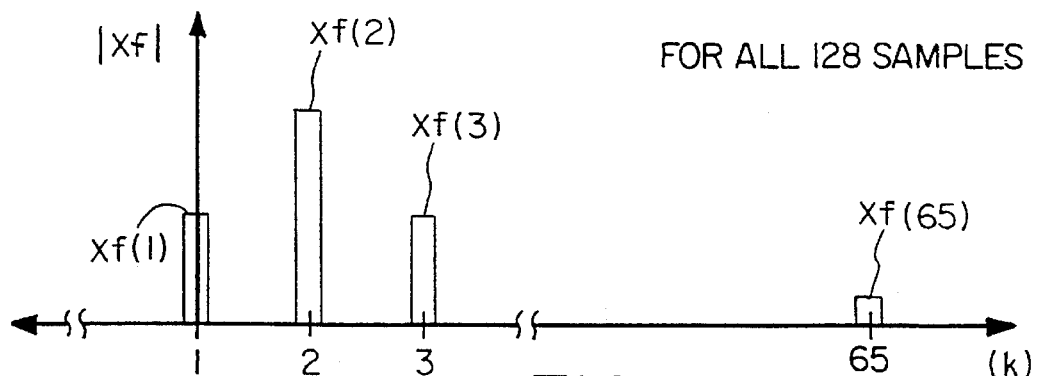

FIG. 11A

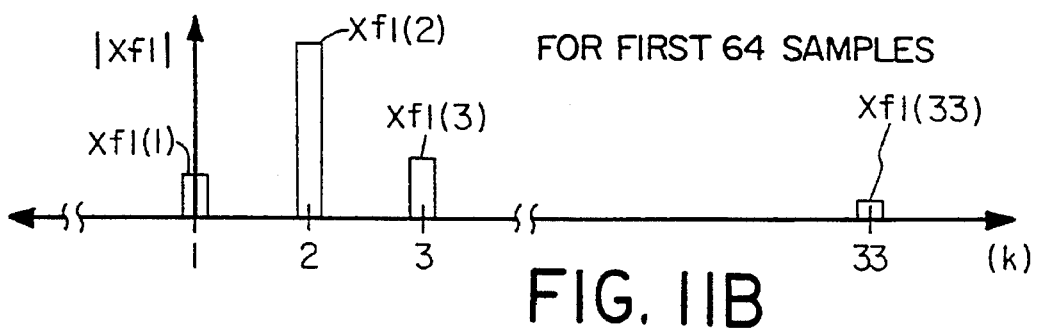

FIG. 11B

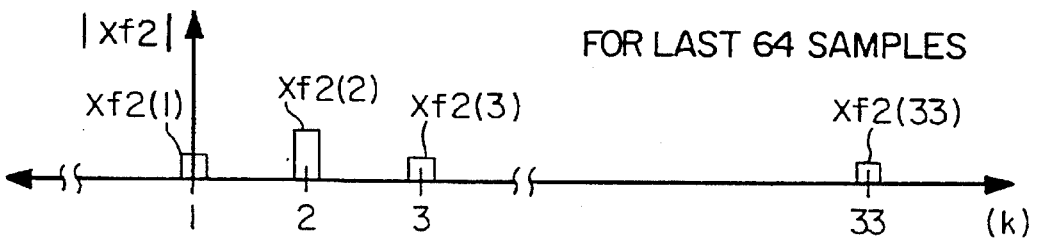

FIG. 11C

```
┌─────────────────────────────────────┐
│   RANGE AND BEARING CALCULATION     │
└─────────────────────────────────────┘
                 ↓
┌─────────────────────────────────────────────────────┐
│ DETERMINE RANGE WEIGHTS BASED ON CLASSIFIED TYPE OF STRIKE │
└─────────────────────────────────────────────────────┘
                 ↓
┌─────────────────────────────┐
│  DETERMINE BEARING WEIGHTS  │
└─────────────────────────────┘
                 ↓
┌─────────────────────────────────────────────────────┐
│ CALCULATE RANGE AND BEARING VALUES FOR X AND Y BASED ON │
│ WEIGHTS; CALCULATE RANGE AND BEARING                │
└─────────────────────────────────────────────────────┘
                 ↓
┌─────────────────────────────────────────────────────┐
│ CORRECT RANGE WITH CORRECTION FACTOR: r' = g(r, TYPE) * r │
└─────────────────────────────────────────────────────┘
                 ↓
              ( END )
                 ↓
              RETURN
```

FIG. 12

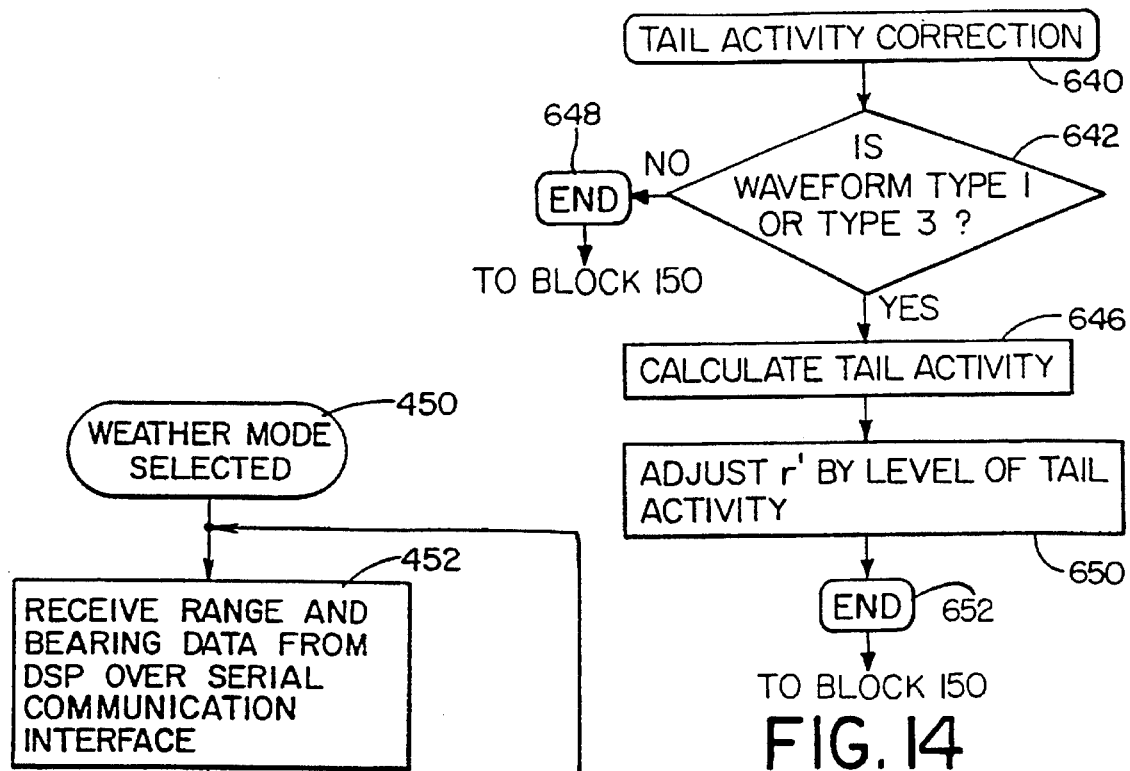
FIG. 14
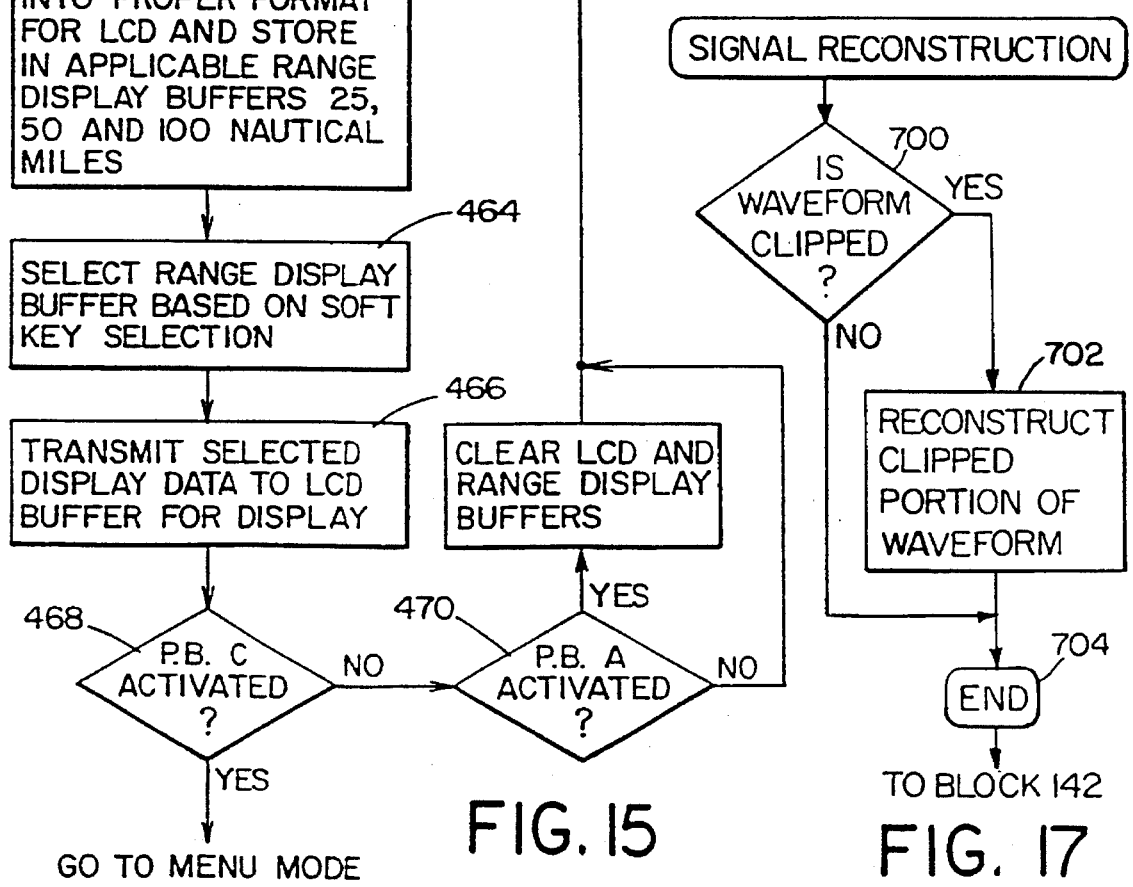
FIG. 15
FIG. 17

LIGHTNING STRIKE DETECTION AND MAPPING SYSTEM

BACKGROUND OF THE INVENTION

The present invention is related, as is indicated, to a lightning strike detection and mapping system. More particularly, the present invention relates to a system capable of sampling input signal waveforms and processing such waveforms; in a manner which provides fast, accurate information on the location of lightning strikes.

It is well known that thunderstorms present a serious threat to airborne craft as a result of the dangerous turbulence, up and down drafts, wind shear and other violent atmospheric disturbances generated thereby. Thunderstorms for the most part are comprised of clusters of cells which grow and dissipate within the storm through a variety of stages. Most of the violent lightning occurred coincidentally with the violent atmospheric disturbances during the mature stage of the storm cells. This strong correlation between the threatening atmospheric disturbances and electrical discharges was used by Ryan to create a weather mapping system known as Stormscope®, which was disclosed in the U.S. Pat. No. 4,023,408 which is currently assigned to the same assignees as the instant application.

The Ryan system is capable of measuring pulse type electromagnetic radiation generated through the atmosphere from the large electric currents flowing within the lightning channel during a lightning stroke for the detection thereof. Ryan's system used an inverse relationship of the measured radiation to map the detected lightning strike on a display in range and bearing relative to an observation location which, for example, may be the location of the aircraft. In one embodiment, the observation location was calibrated at the center of the display screen and each displayed stroke appeared as a substantial point source at a bearing and radial dimension from the screen center, the radial dimension being proportional to the range measurement of the corresponding lightning stroke.

The dimension between the displayed stroke and screen center was not necessarily a measure of the actual range from the aircraft to the stroke but rather an approximation of range based on a mix of distance and intensity information of the detected lightning stroke. The Ryan system did not take into account the variety of lightning strikes, like return strikes, leader strikes and intra cloud strikes, nor did the system utilize the different frequency and pulse width characteristics of these different strikes.

While the Ryan technology described by the aforementioned '408 patent has met and continues to meet a significant commercial need, further improvements are always desirable. For example, by classifying the detected lightning strike into a known type, the range and bearing measurements corresponding thereto may be more accurately estimated to narrow the statistical distribution thereof, thus rendering a more accurate range and bearing measurement over a given region for display mapping purposes.

From the teachings of Hans Volland in his edited text "CRC Handbook of Atmospherics", Vol. I, published by CRC Press, Inc. of Boca Raton, Fla. (1982), it is recognized that impulse forms of lightning currents may be characterized into different types by the spectral frequency and pulse width characteristics thereof. A Type 1 current is observed from lightning channel currents of return strikes and commonly referred to as aperiodic waveforms. A Type 2 current is observed from both return and intra cloud strikes and is referred to as damped oscillatory waves. And, Type 3 or K current is a special case of Type 2 and is sometimes referred to as the intermediate type. A more recent model of the Ryan Stormscope technology, referred to as WX-1000, manufactured by BFGoodrich FlightSystems, Inc. and marketed more than one year prior to the filing of the instant application, used pulse width measurements of the lightning strikes to discriminate intra cloud and leader strikes from the others.

In addition, a U.S. Pat. No. 4,672,305 issued to Coleman is directed to a lightning detection system which uses a ratio of low (1.5 kHz) and high (500 kHz) frequency magnetic field components to extend the range thereof. Further, U.S. Pat. No. 4,803,421, and its divisional counterpart U.S. Pat. No. 4,873,483 both issued to Ostrander and assigned to the same assignee as the instant application, are directed to lightning detection and mapping systems which determine lightning locations from the ratio of the integrated intensity of two different field components of lightning generated signals. Also, a data acquisition system for use in gathering lightning strike data is present in the paper "A Lightning Data Acquisition System", authorized by B. M. Stevens, Jr. et al. for the International Aerospace and Ground Conference on Lightning and Static Electricity at Dayton, Ohio, Jun. 24–26, 1986.

Another U.S. Pat. No. 5,295,071 and currently assigned to the same assignee as the present application, uses a filter-based method for estimating the location of the lightning strike. The lightning strike signal is passed through a series of narrow-band filters and the filter outputs are used to determine the range and bearing of the lightning strike.

An area for improvement over the lightning detection systems in the past is additional criteria for analyzing the waveform signals rapidly and accurately to determine the location of a lightning strike. Still another area for improvement is in sensitivity and/or dynamic range of such systems. An improved dynamic range could extend the maximum range at which a valid lightning strike can be detected and mapped to an estimated location.

SUMMARY OF THE INVENTION

In accordance with one aspect of the invention, a system for classifying detected lightning strikes is provided including means for receiving a signal waveform representative of a lightning strike; means for computing a Fourier Transform (FT) of at least a portion of the signal waveform; and means for classifying the lightning strike represented by the signal waveform into a type based on the FT.

In accordance with another aspect of the invention, a system for classifying detected lightning strikes is provided including means for receiving a signal waveform representative of a lightning strike; means for sampling the received signal waveform and for digitizing the samples to generate a train of digital data samples; means for computing a Discrete Fourier Transform (DFT) of at least a portion of the train of digital data samples; and means for classifying the lightning strike represented by the signal waveform into a type based on the DFT.

According to another aspect of the invention, a system for estimating a location of a detected lightning strike with reference to an observation location is provided, such system including means for receiving a signal waveform representative of a lightning strike; means for sampling the received signal waveform and for digitizing the samples to generate a train of digital data samples; means for computing a Discrete Fourier Transform (DFT) of at least a portion of the train of digital data samples; and means for estimating a location of the lightning strike based on the DFT.

In accordance with yet another aspect of the present invention, a system for estimating a location of a detected lightning strike with reference to an observation location is provided, such system including means for receiving a signal waveform representative of a lightning strike; means for estimating a location of the lightning strike based on energy in the received signal waveform, the estimated location being inversely related to the energy; means for classifying the lightning strike into a type selected from a plurality of predetermined types based on the signal waveform; and means for adjusting the estimated location according to a predetermined criteria corresponding to the selected type, the predetermined criteria being based on predefined range limits associated with the classified type.

According to still another aspect of the invention, a system for classifying detected lightning strikes is provided including means for receiving a signal waveform representative of a lightning strike; means for determining whether the signal waveform is a doublet waveform comprising a bipolar pulse and relatively little activity outside of the bipolar pulse; and means for classifying the lightning strike represented by the received signal waveform into a type based on whether the signal waveform is determined to be a doublet waveform.

In accordance with yet another aspect of the present invention, a system for estimating a location of a detected lightning strike with reference to an observation location is provided, such system including means for receiving a signal waveform representative of a lightning strike; means for determining whether the signal waveform is a doublet waveform comprising a bipolar pulse and relatively little activity outside of the bipolar pulse; and means for estimating a location of the lightning strike based on whether the signal waveform is determined to be a doublet waveform.

According to still another aspect of the present invention, a system for estimating a location of a detected lightning strike with reference to ah observation location is provided, such system including means for receiving a signal waveform representative of a lightning strike, the signal waveform having a main portion followed in time by a tail portion; means for comparing an amount of energy in the tail portion with an amount of energy in the main portion; and means for estimating a location of the lightning strike based on the comparison of the energy in the tail portion with the energy in the main portion.

In accordance with even another aspect of the present invention, a system for classifying detected lightning strikes is provided including means for receiving a signal waveform representative of a lightning strike; means for identifying a portion of the received signal waveform which has undergone clipping; means for reconstructing the portion of the signal waveform; and means for classifying the lightning strike represented by the received signal waveform into a type based on the reconstructed portion.

According to still another aspect of the present invention, a system for estimating a location of a detected lightning strike with reference to an observation location is provided, such system including means for receiving a signal waveform representative of a lightning strike; means for identifying a portion of the received signal waveform which has undergone clipping; means for reconstructing the portion of the signal waveform; and means for estimating a location of the lightning strike based on the reconstructed portion.

BRIEF DESCRIPTION OF THE DRAWINGS

FIGS. 6A–6B are is a software: flow chart suitable for programming the DSP to detect and to acquire valid strike data in the lightning strike detection and mapping mode of operation.

FIG. 7 is a software flow chart suitable for programming the DSP to calculate the pulse width of a detected signal.

FIGS. 11A–11C are exemplary discrete Fourier Transforms of lightning strike data in accordance with the present invention.

FIG. 12 is a software flow chart suitable for programming the DSP to calculate the range and bearing of the lightning strike based on the type classification.

FIG. 14 is a software flow chart suitable for programming the DSP to determine the range of the lightning strike on the basis of tail activity in the waveform.

FIG. 15 is a software flow chart suitable for programming the microcontroller to operate in a weather mapping mode.

FIG. 17 is a software flow chart suitable for programming the DSP to reconstruct the lightning strike data in the event of clipping.

DESCRIPTION OF THE PREFERRED EMBODIMENTS

Figure 1A:
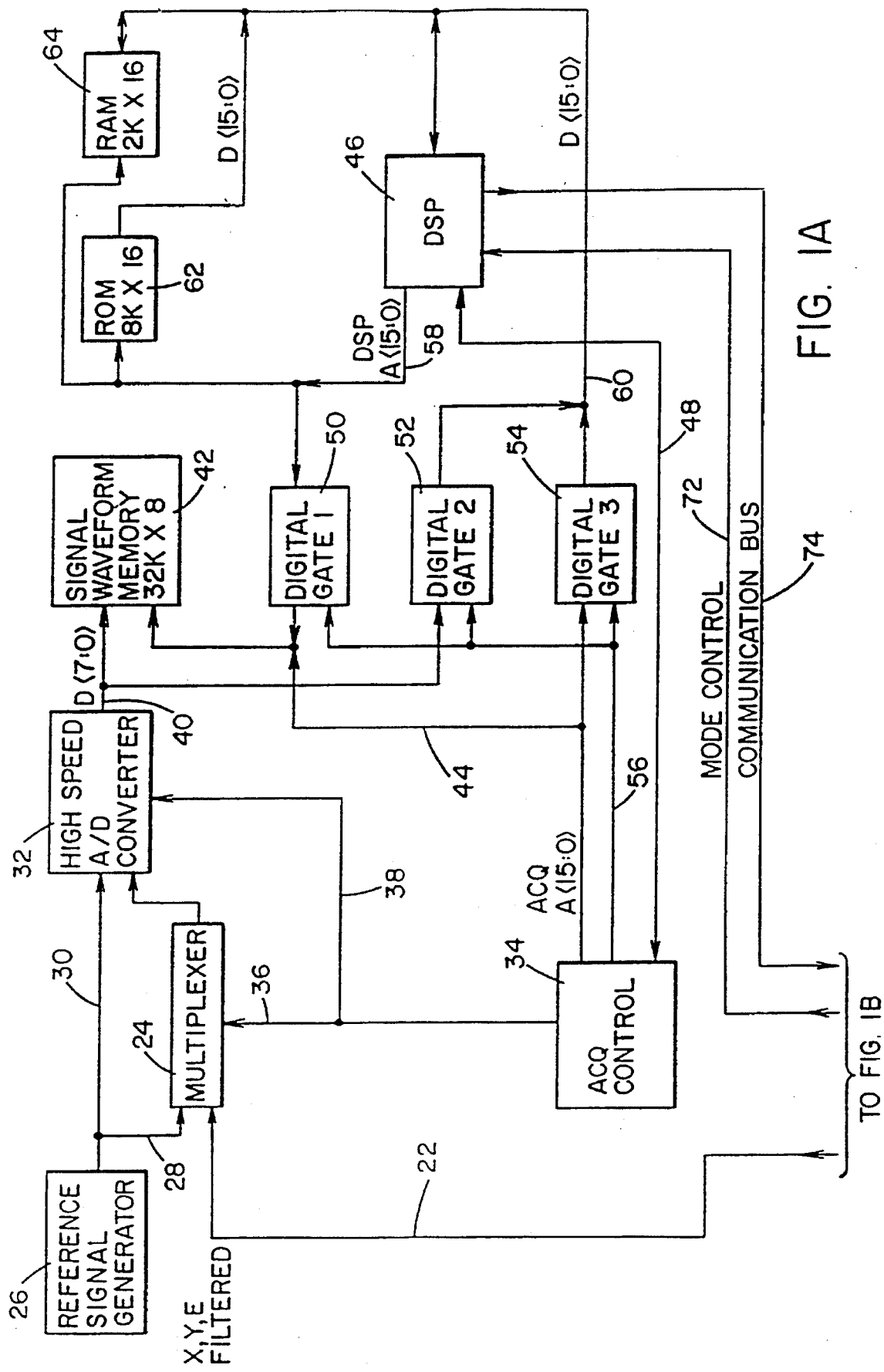
FIGS. 1A–1B are a functional block diagram schematic of a lightning strike detection and mapping system suitable for embodying the principles of the present invention.
Figure 1B:
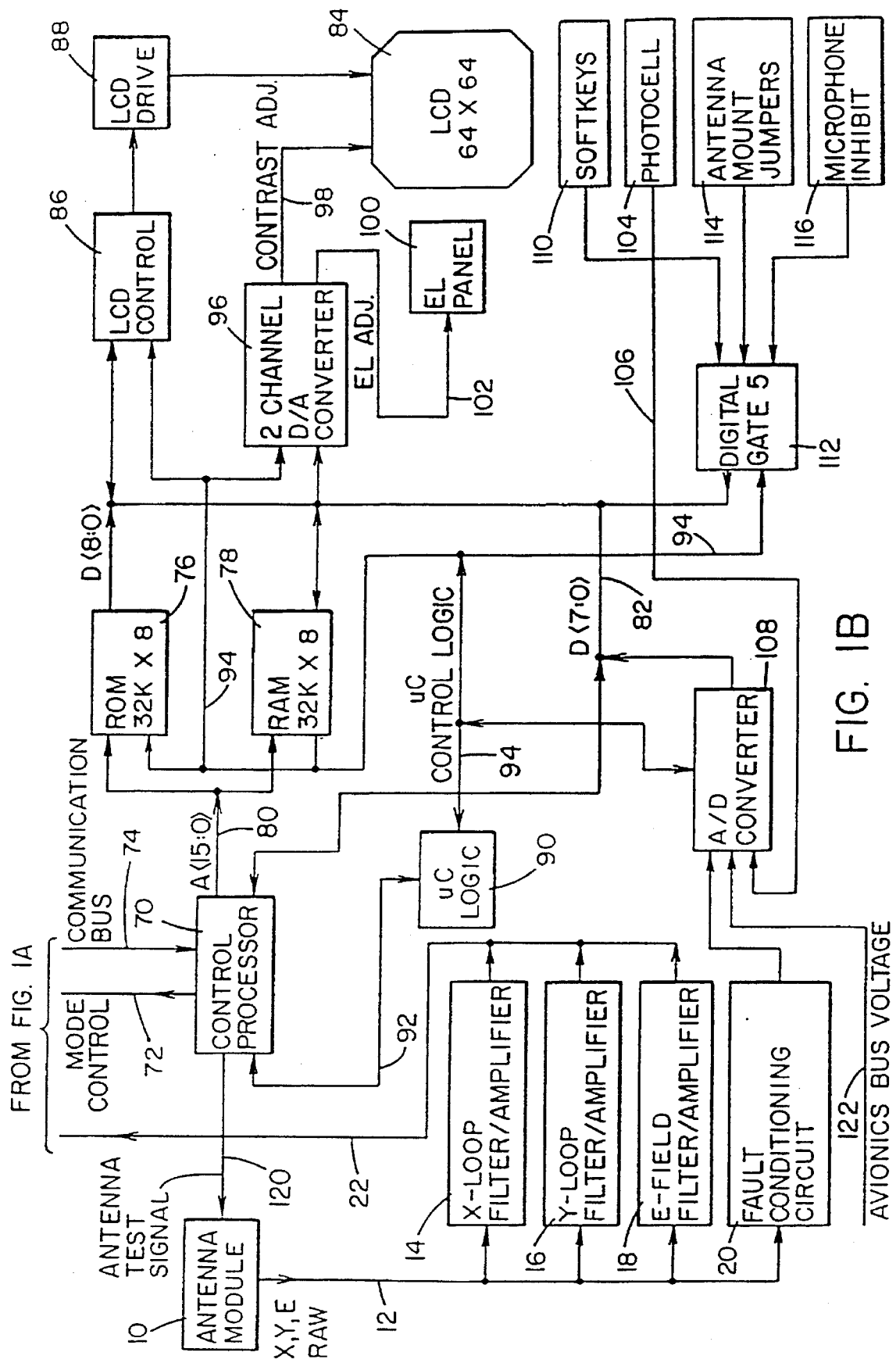

FIG. 1 is a functional block diagram of a lightning strike detection and mapping system suitable for embodying the principles of the present invention. Referring to FIG. 1, an antenna module 10 includes a conventional crossed loop antenna for sensing and receiving the magnetic field radiated from a lightning strike. The module 10 includes conditioning circuits coupled to the loop antenna for generating signal waveforms denoted as X and Y representative of the received components of the magnetic field. In the present embodiment, the X and Y signals are substantially orthogonal. Further, the antenna module 10 includes a sense antenna which may be non-directional for sensing and receiving an electrical field radiated from a lightning strike and conditioning circuitry coupled to the sense antenna for generating a signal waveform E representative of the received electric field.

The generated signals X, Y and E are provided over a path 12 to respective filter/amplifiers 14, 16 and 18 for the further conditioning thereof. The three signals X, Y and E are also provided to a fault conditioning circuit 20. The conditioned X, Y and E signals are provided over a path 22 to respective inputs of a multiplexer 24. In addition, a reference signal generator 26 generates one reference signal over path 28 to another input of the multiplexer 24 and another reference signal over path 30 to a reference signal input of a high speed analog-to-digital A/D converter 32.

A data acquisition (ACQ) control block 34 controls the sampling of the X, Y and E signal waveforms and the reference signal by the path 36 and controls the digitizing thereof by the converter 32 with signals over the path 38. In the present embodiment, the digitized samples are generated as a train of data samples provided at a rate of 333 kilosamples per second and corresponding to and representative of each of the X, Y and E signal waveforms and conducted over an 8 bit data bus 40 to a signal waveform memory 42 for storage therein. The ACQ control block 34 addresses the memory 42 utilizing an address bus 44 to designate the storage register of each of the digitized data samples.

The ACQ control block 34 coordinates its operational activities with a programmed digital signal processor (DSP) 46 utilizing bi-directional signal lines 48. The ACQ control block 34 also governs the operation of three digital gates 50, 52 and 54 by the signals over path 56. In the present embodiment, the DSP 46 is capable of addressing the memory 42 using its address bus 58 via gate 50 and also of reading the contents of the addressed storage register of memory 42 over a portion of its data bus 60 via gate 52. The DSP 46 is also capable of reading the ACQ address bus 44 over its data bus 60 via gate 54. The digital signal processing section further includes a read only memory (ROM) module 62 and a random access memory (RAM) module 64 both of which being coupled to the DSP 46 over the address and data busses 58 and 60, respectively. In this embodiment, the DSP 46 processes the data samples of the sampled-data waveform trains to detect a lightning strike and estimates a location thereof for a weather mapping process as will be described in more detail below.

Further in the present embodiment, the operations of the DSP 46 are controlled to a great extent by a programmed control processor 70 utilizing signal lines over a path 72 connecting the processor 70 and DSP 46. In addition, processed data, like the location of the detected lightning strike with respect to an observation location, for example, is provided from the DSP 46 to the control processor 70 over a communication bus 74 coupling the two units. The control processing section also includes a read only (ROM) memory 76 and a random access (RAM) memory 78 which are coupled to the control processor 70 through an address bus 80 and a data bus 82.

The control processor or microcontroller 70 is programmed to drive a display unit 84 from the data bus 82 utilizing a control block 86 and drive block 88 both of which may be part of the display module 84. In the present embodiment, the display module 84 is a liquid crystal display (LCD) having on the order of a 64 by 64 pixel array. An ancillary logic block 90 coordinates operational activities with the control processor 70 utilizing a bi-directional signal path 92 to generate and receive logic signals over a bi-directional path 94 which is coupled to the various modules of the control processing section, like the memories 76 and 78 for enabling and controlling read and write operations, for example. The signal path 94 is also coupled to the control block 86 to enable and control the operations thereof as well.

The control processor 70 is also capable of controlling the brightness and contrast of the display module 84 utilizing a two channel digital-to-analog (D/A) converter 96 which is coupled to the processor 70 through the data bus 82. The enabling arid control of the converter 96 is provided by signals over path 94. One output signal of the converter 96 governs the contrast of the display unit 84 over path 98 and the other signal adjusts brightness of a back panel light module 100 of the display module 84 over path 102. A photocell 104 disposed in close proximity to the display unit 84 measures ambient light conditions and generates a signal over path 106 representative thereof. The control processor 70 is capable of reading the signal 106 through an analog-to-digital (A/D) converter 108 and the data bus 82. Once again, the signals of the path 94 enable and operate the converter 108.

Still further, operator interface pushbuttons referred to as softkeys and designated by block 110 may be read by the control processor 70 through a digital gate 112 and the data bus 82. The gate 112 also permits reading of other digital signals, like antenna mount jumpers designated by the block 114 and a microphone inhibit signal designated by the block 116, for example. Similarly, the gate 112 is enabled and controlled by the logic signals of path 94.

Finally, the control processor 70 is capable of generating an antenna test signal over path 120 to the antenna module 10 for testing the X, Y and E receiving circuits thereof. Resultant test signals of the X, Y and E circuits are conducted over the path 12 and through the conditioning circuit 20 to the A/D converter 108 for reading by the control processor 70 via the data bus 82. Still further, the control processor 70 is capable of monitoring the power source of the system by reading the bus voltage thereof over path 122 utilizing A/D the converter 108 and data bus 82.

The foregoing description of the functional block embodiment of FIG. 1 is provided merely as an overview of the lightning strike system. A more detailed description of the features and components of the lightning strike system of FIG. 1 and the operation thereof is found in U.S. Pat. No. 5,295,071, issued on Mar. 15, 1994, and in U.S. Pat. No. 5,295,072, also issued on Mar. 15, 1994, the entire disclosures of which are both incorporated herein by reference.

The present invention relates to a number of variations and improvements in the signal processing in the lightning strike system of FIG. 1 as disclosed in U.S. Pat. Nos. 5,295,071 and 5,295,072. Such variations and improvements have been found to provide improved ranging and type classification of lightning strikes based on analysis of the data acquired by the system. The following detailed description of the lightning strike system of FIG. 1 focuses primarily on the new signal processing aspects according to the present invention. It will be appreciated that the system operation and hardware of the present invention in general is identical-in substantive respect to that of the systems described in the above-identified '071 and '072 patents unless otherwise noted herein. Further details in connection with the system operation and hardware in general have been omitted in the present description for sake of clarity.

Figure 2:
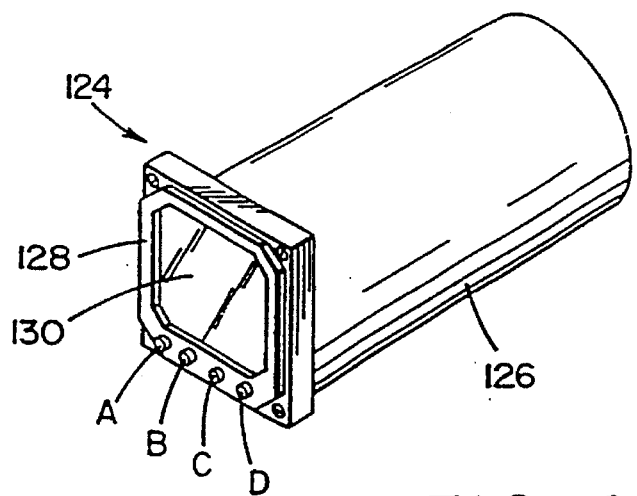
FIG. 2 is an illustration of an exemplary physical embodiment of the preferred system which depicts the display module and the electronic processing section enclosure thereof.

Referring briefly to FIG. 2, an illustration of an exemplary physical embodiment of the preferred system shows the display module depicted at 124 and the electronic processing section enclosed within an enclosure depicted at 126. Four softkeys or pushbuttons A, B, C and D are disposed at the bottom of the display section 124 within a bezel mount 128 surrounding the a panel LCD unit 130. The photocell or ambient light measuring instrument may be disposed in close proximity to the display 130 like, for example, in the bezel 128 thereof.

As is described in detail in the aforementioned U.S. Pat. Nos. 5,295,071 and 5,295,072, the lightning strike detection and mapping system of FIG. 1 performs the processing operations for lightning detection and mapping including the following functions: (1) performs high speed analog-to-digital conversion of the low pass filtered analog lightning strike signals XLP, YLP and EFD obtained from the X and Y components of the received magnetic field and the E component of the received electric field, respectively, (2) stores the sampled-data signals representative of the XLP, YLP and EFD waveforms in a high speed waveform buffer memory, (3) monitors the digitized samples of the XLP and YLP magnetic field representative signals for threshold triggering, (4) discriminates between valid and invalid strike signals to provide "intelligent triggering", (5) classifies the detected lightning strike into a type selected from a predetermined plurality of types for each valid lightning strike signal and calculates the location thereof by estimating range and bearing, in reference to an observation location, based on the type classification and (6) transmits the type and location information for each valid lightning strike signal to the controller module for map display thereof on the display module.

In accordance with the present invention in particular, the lightning strike detection and mapping system determines the range and bearing of each valid lightning strike with increased accuracy and speed by (1) computing the Fourier Transform, and most preferably the discrete Fourier Transform (DFT) of the X and Y waveforms, classifying the lighting strike based on the DFTs, and estimating the range and bearing of the lightning strike based on a type-dependent weighted sum of the DFT coefficients; (2) detecting whether the X or Y waveform is a doublet waveform and classifying the lightning strike based on the detection of a doublet; (3) performing range correction based on type classification and tail activity; and (4) reconstructing any clipped waveforms in order to extend the dynamic range of the system.

It is understood that the microcontroller 70 and DSP 46 as described here above are programmed with operational and application programs which may be stored in their respective ROM's 76 and 62, respectively, to perform a variety of tasks initiated upon the application of power thereto. A set of software flow charts exemplifying suitable programming of the micro controller 70 and DSP 46 are provided starting with FIG. 3. It will be appreciated that a person having ordinary skill in the art of programming will be able to program the microcontroller 70 and the DSP 46 to carry out the various functions described herein based on the present disclosure without undue effort.

Figure 3:
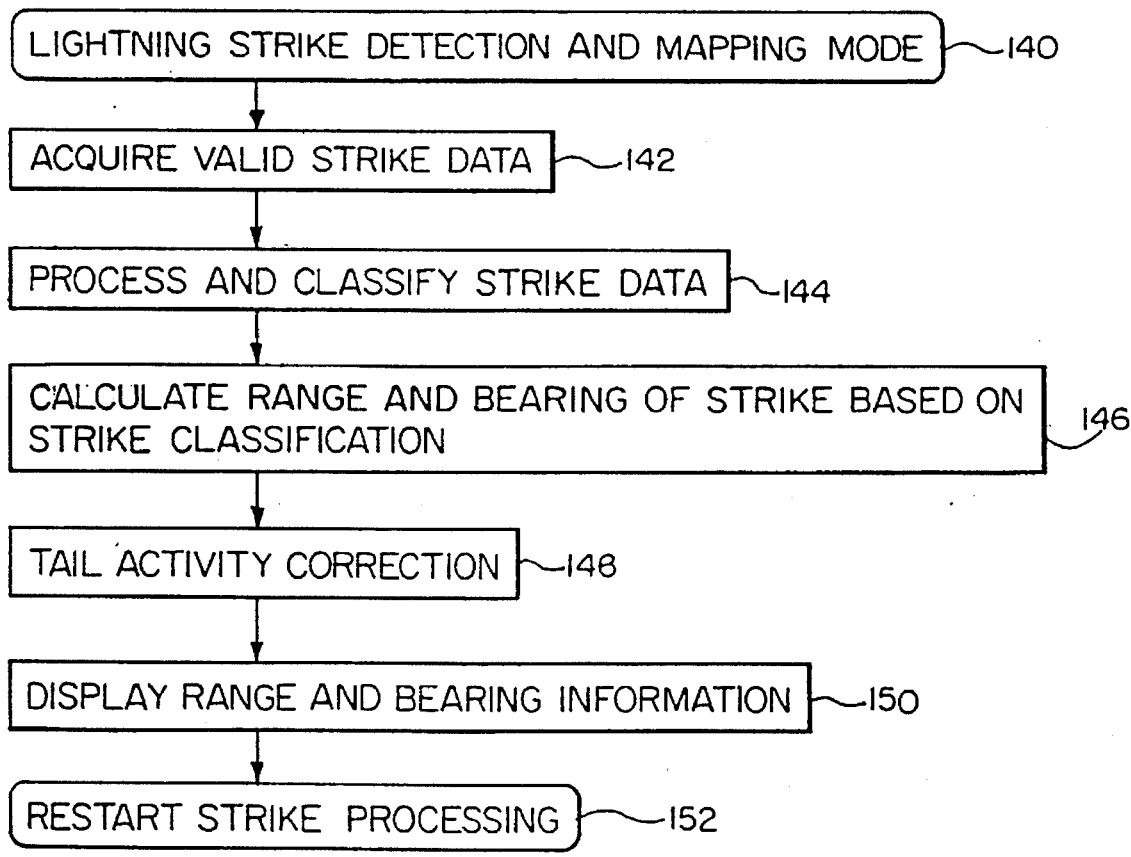
FIG. 3 is a software flow chart suitable for programming the microcontroller and the DSP to operate in a lightning strike detection and mapping mode in accordance with the present invention.

Referring now to FIG. 3, a system flow chart is provided which describes the general operation of the lightning strike detection system of FIG. 1 for detecting and mapping lightning strikes in accordance with the present invention. The system enters the lightning strike detection and mapping mode at 140 in response to an operator menu selection or the like. In block 142, the system acquires valid strike data including the X, Y and E data as is explained in detail below in connection with FIG. 6.

After valid strike data has been acquired in block 142, the system proceeds to block 144 in which the strike data is processed and the lightning strike is classified as one of a plurality of predetermined types of lightning strikes. More particularly, the system computes DFTs of the X and/or Y signal components as is described below in connection with FIG. 9. The system analyzes the results of the DFT based on a predetermined criteria to determine the type of each particular lightning strike. The system also determines in block 144 whether the X or Y component of the received magnetic field is a doublet waveform. The applicants have found that if the waveform is a doublet waveform this indicates a particular type of intracloud lightning strike. The system determines whether the waveform is a doublet waveform based on a predetermined criteria described more fully below in relation to FIG. 10.

The system proceeds to block 146 in which the system calculates the range and bearing of the detected lightning strike based on the type classification. More particularly, the system selects a predefined set of type-dependent weights corresponding to the type classification determined in block 144. These weights are combined with the DFT coefficients to compute the range and bearing of the lightning strike as is described below in connection with FIG. 12.

The range and bearing calculation according to one embodiment described below is based on sets of weights representing one or more linear functions. In a different embodiment, the weights are based on a combination of other predetermined criteria which can be non-linear in nature but which provide additional ranging accuracy as is discussed below with respect to FIGS. 13A–13D.

In block 148 the system analyzes the tail activity in the detected lightning strike waveform. The applicants have found that by analyzing the tail activity, additional information regarding the range of the lightning strike can be ascertained. The system makes use of this information to provide a correction factor which the system uses to refine the range calculation provided in block 146 as is described below with respect to FIG. 14.

The system proceeds to block 150 wherein the system displays the range and bearing of the lightning strike on the display 124 (FIG. 2). Such display of the range and bearing information is described below in connection with FIGS. 15 and 16. Following block 150, the system proceeds to block 152 in which the above-described process is repeated for the next lightning strike and the display information is updated.

The lightning strike detection and mapping system in accordance with the exemplary embodiment of the present invention classifies lightning strikes as one of either a Type 1, Type 2, Type 3, Type 4 or Type 5 waveform. Based on such classifications, the system calculates the range and bearing of the lightning strikes. The classifications and the particular criteria described herein for classifying the lighting strikes are preferred and are based on studies by the applicants of numerous lightning strikes. It will be appreciated, however, that other classifications and/or classification criteria can be used in a different embodiment without departing from the scope of the present invention.

Figure 4A:
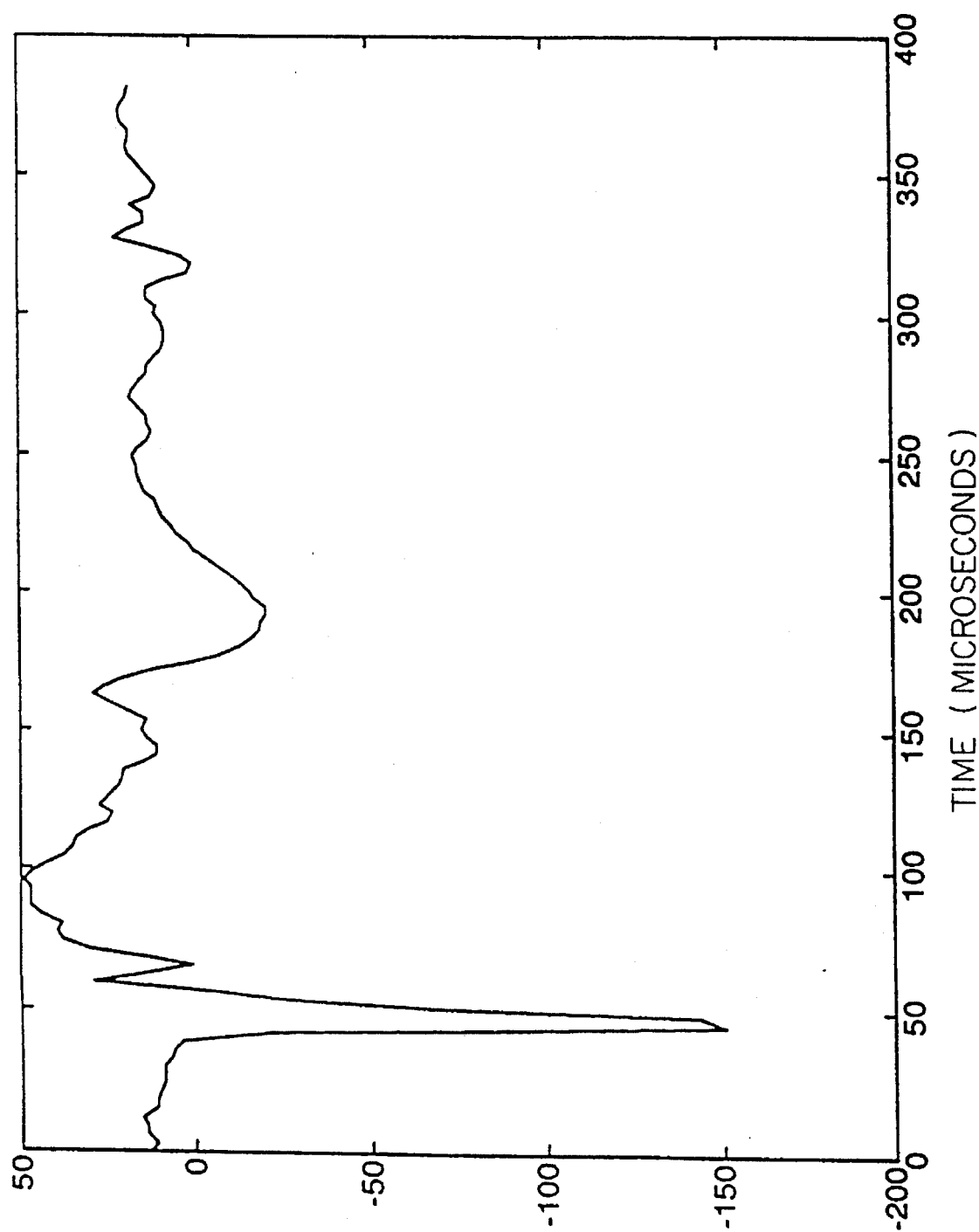
FIGS. 4A–4D represent exemplary waveforms for Type 1 through Type 4 waveforms, respectively, in accordance with the present invention.

FIGS. 4A–4D are representative of Type 1 through Type 4 waveforms, respectively, in accordance with the exemplary embodiment of the present invention. The respective waveforms represent the measured magnetic field (either the X or Y component) with respect to time as is indicated. FIG. 4A is an example of a Type 1 waveform. Type 1 waveforms correspond to classical ground return stroke waveforms. Type 1 waveforms are characterized by a monopulse-type waveform which has a sharp risetime, a more gradual fall time, and a main pulse width of 15 to 25 microseconds. After the main pulse, the waveform typically reverses sign, then decays more slowly to zero.

Figure 4B:
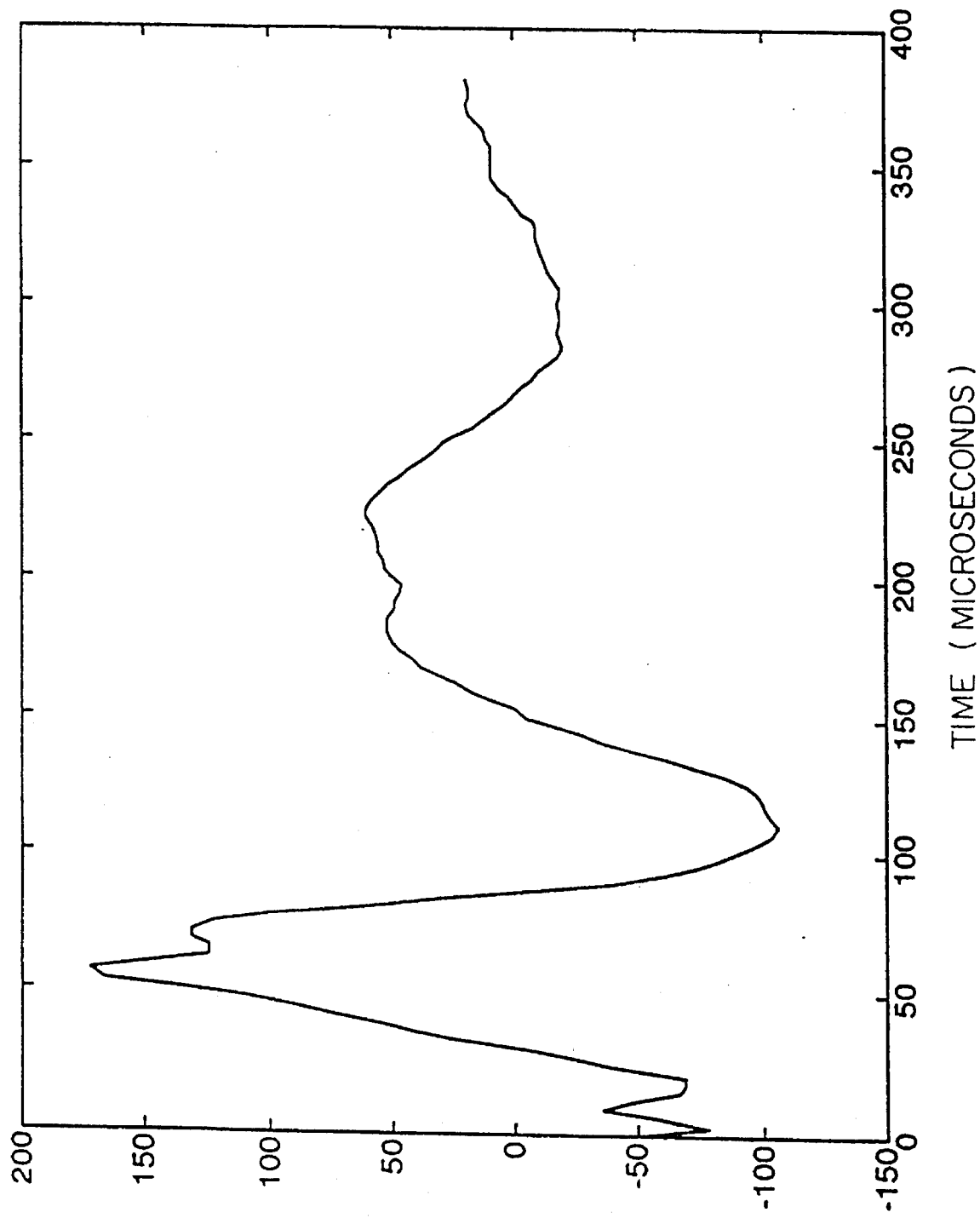

FIG. 4B exemplifies a Type 2 waveform which is characterized by a broader main pulse as compared to a Type 1 waveform, lower frequency content, and at times a large low frequency oscillation (less than 8 kHz). The main pulse tends to have a slower risetime, and is typically more symmetric than in Type 1 waveforms. The frequency content is much more concentrated at low frequencies, and the pulse width is rarely under 25 microseconds. The low frequency content is believed to be due to the attenuation of higher frequency components as the pulse propagates long distances; thus, Type 2 waveforms are likely to be return strokes (of Type 1) as seen at longer ranges.

Figure 4C:
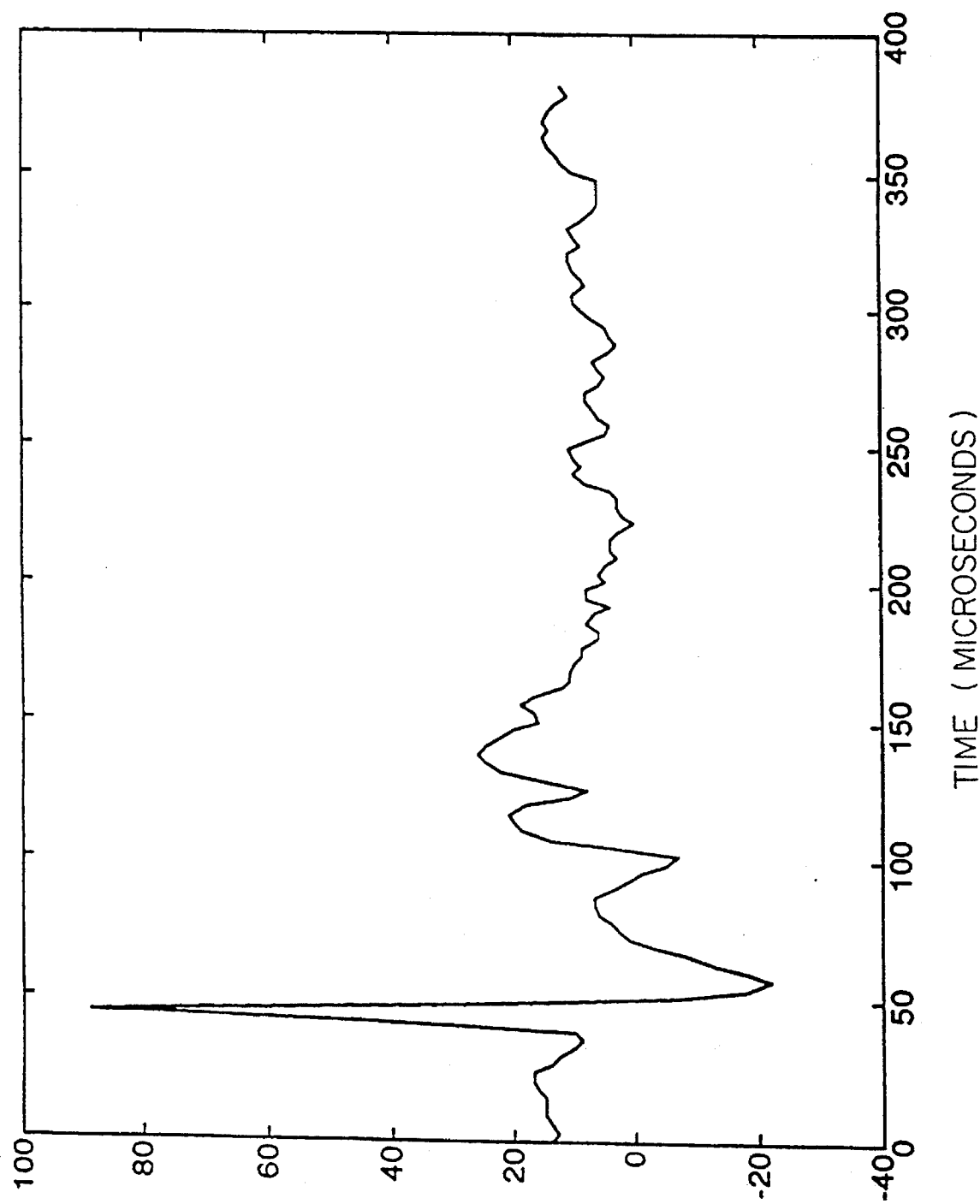

Type 3 waveforms relate to general intracloud waveforms and fall into two general categories. The first category is characterized as having a narrow main pulse similar to a Type 1 waveform, but has a pulse width of approximately 8 to 15 microseconds and its frequency spectrum is correspondingly higher than a Type 1 waveform. FIG. 4C shows an example of such a Type 3 waveform. The second category of Type 3 waveform is characterized generally by a "messy" waveform, often with several peaks but no dominant peak. It is believed that such a waveform likely results from complicated intracloud discharge activity. This second category of Type 3 waveform also has relatively higher frequency content. Because intracloud activity is weaker than return strokes, it will be appreciated that detected Type 3 waveforms are likely to be closer than return strokes.

Figure 4D:
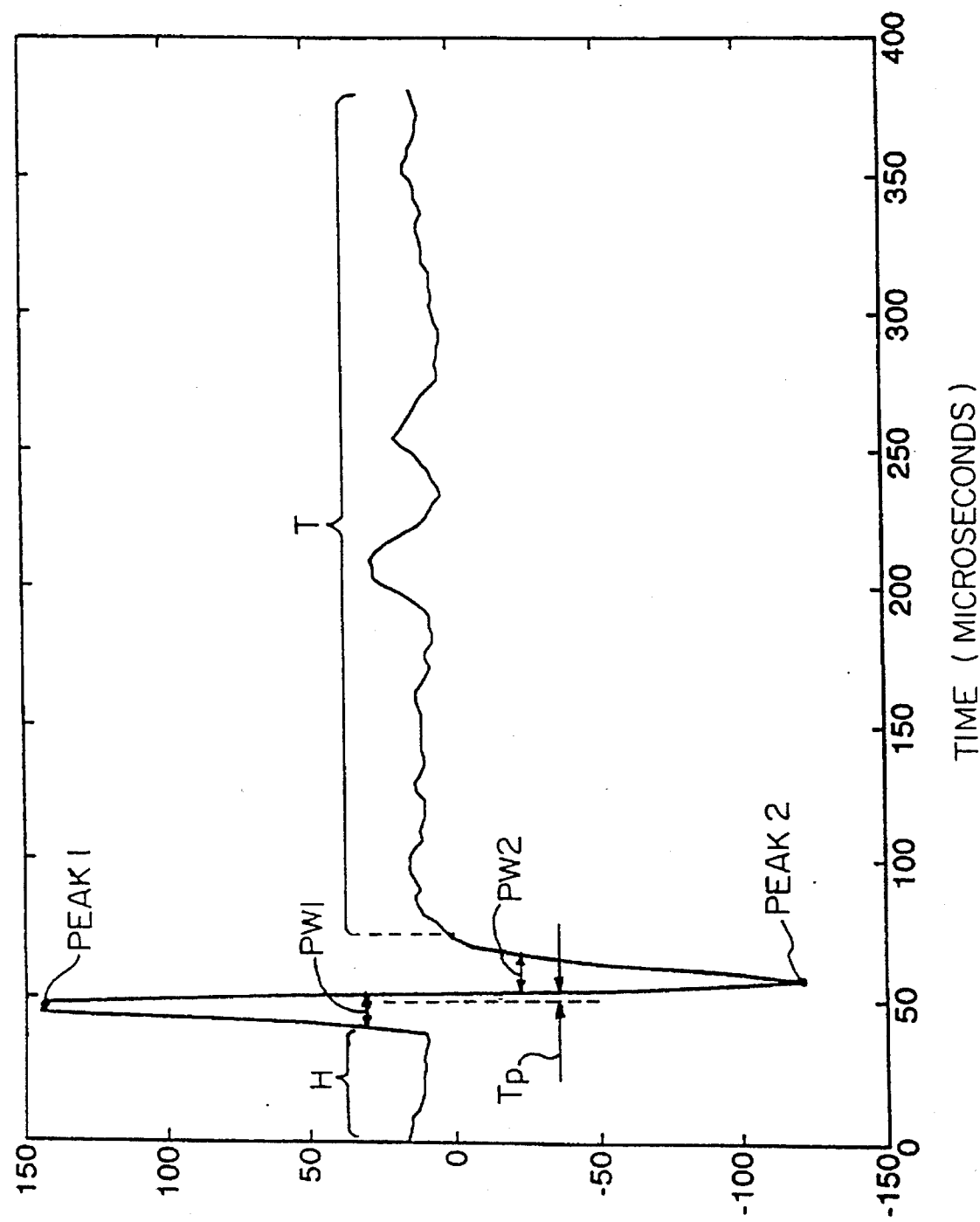

FIG. 4D represents an exemplary Type 4 waveform which is characterized by a bipolar pulse, or doublet waveform. The two individual pulses that make up the bipolar pulse are adjacent and approximately equal in magnitude. The respective pulse widths are relatively narrow (typically 10 to 20 microseconds). In addition, the energy of the waveform is close to zero for some period following the doublet. It is believed that doublet waveforms may arise from stepped leaders that precede the return stroke; thus, the lightning strike must be relatively close in order to detect the stepped leaders.

A Type 5 waveform (not shown) is characterized as being any other waveform which does not readily meet the aforementioned criteria of any one of the Type 1 through Type 4 waveforms. Sometimes Type 5 waveforms are caused by a waveform that triggers too early, so the main pulse of the Type 5 waveform does not occur near the beginning of the sampled waveform. In other cases, the waveform appears to be a superposition of two or more strikes, or may be on the borderline between some of the other types described above. Type 5 waveforms tend to occur at all ranges, with no significant range discrimination associated with lightning type alone.

Figure 5A:
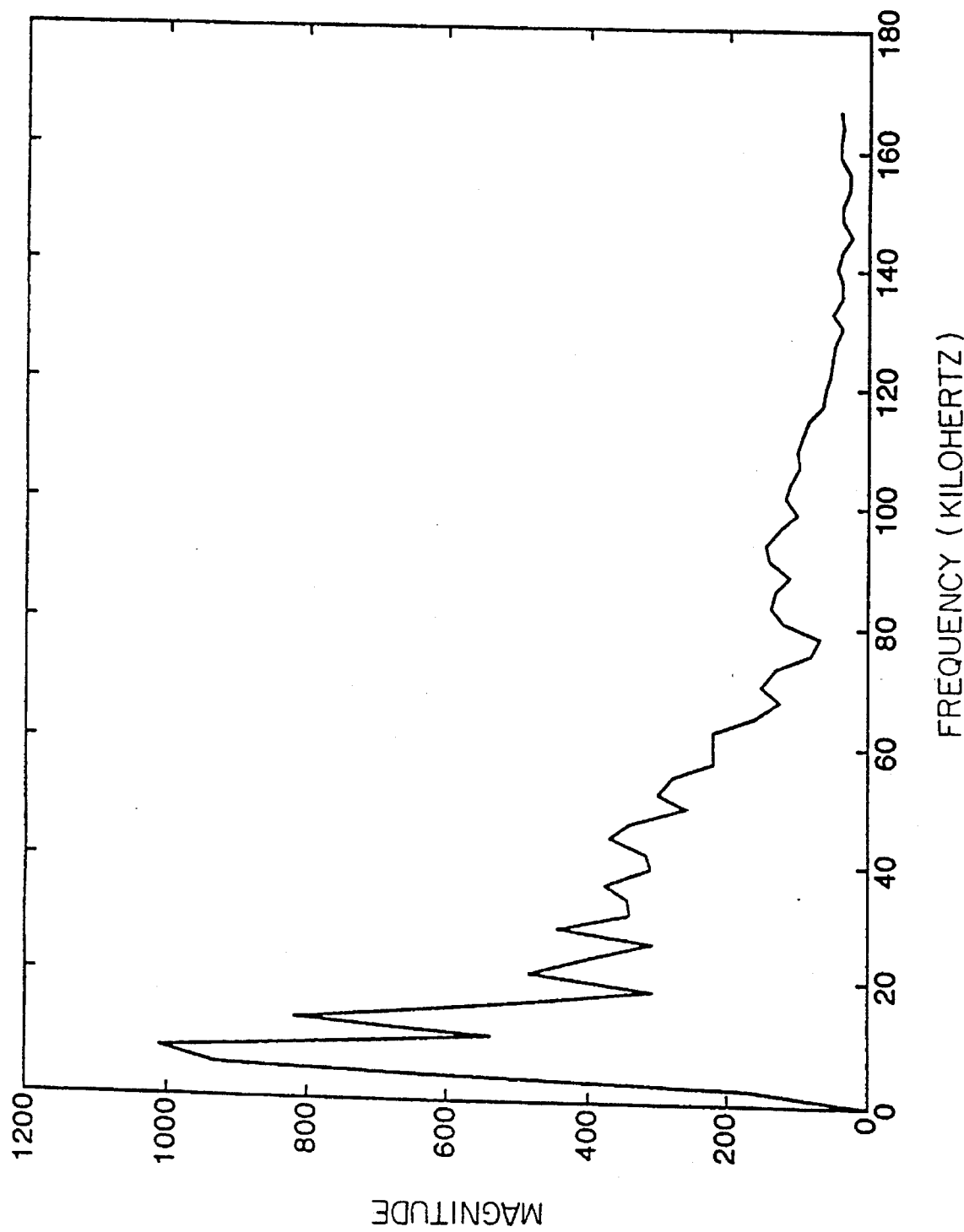
FIGS. 5A–5D represent exemplary frequency spectrums for Type 1 through Type 4 waveforms, respectively, in accordance with the present invention.
Figure 5B:
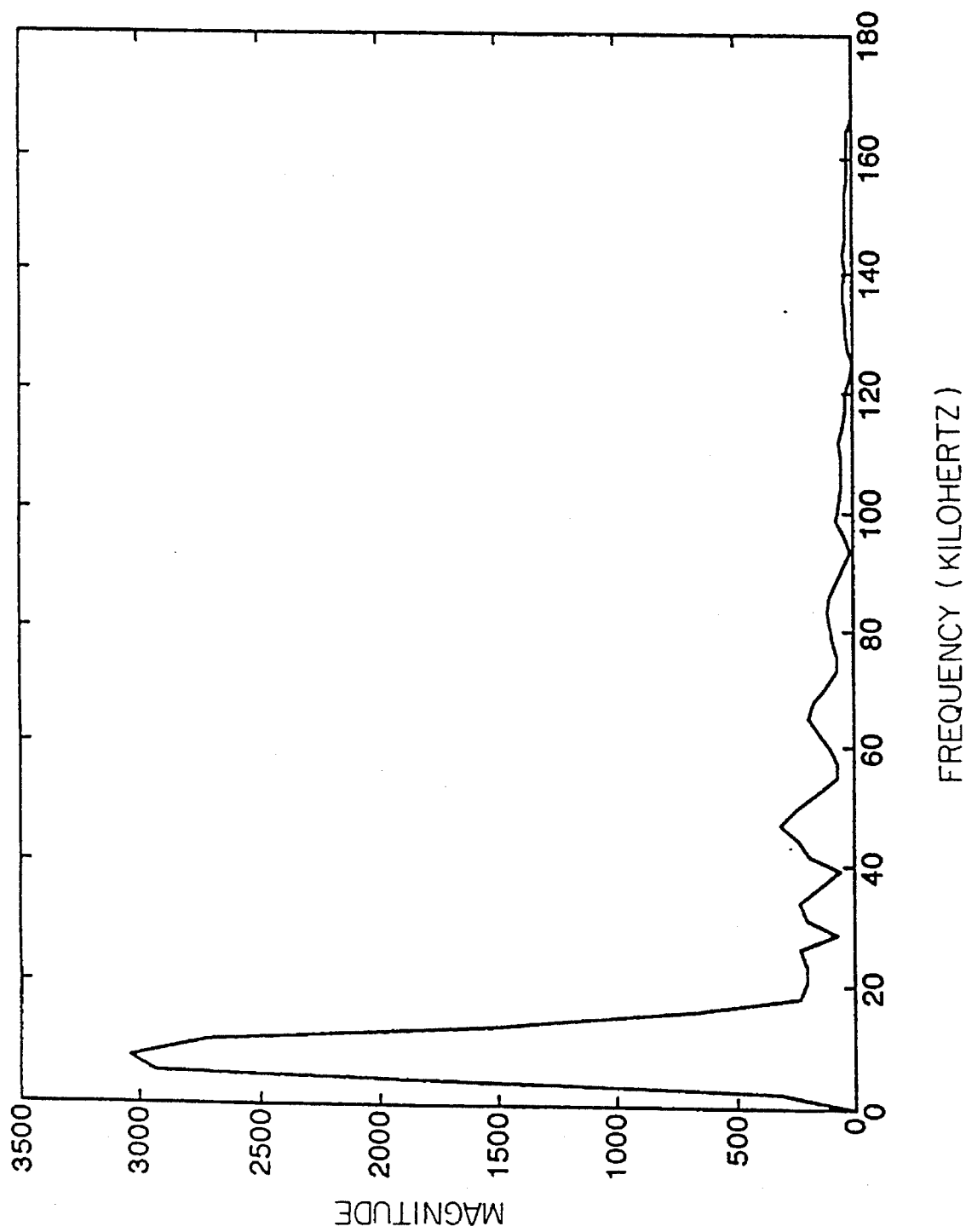
Figure 5C:
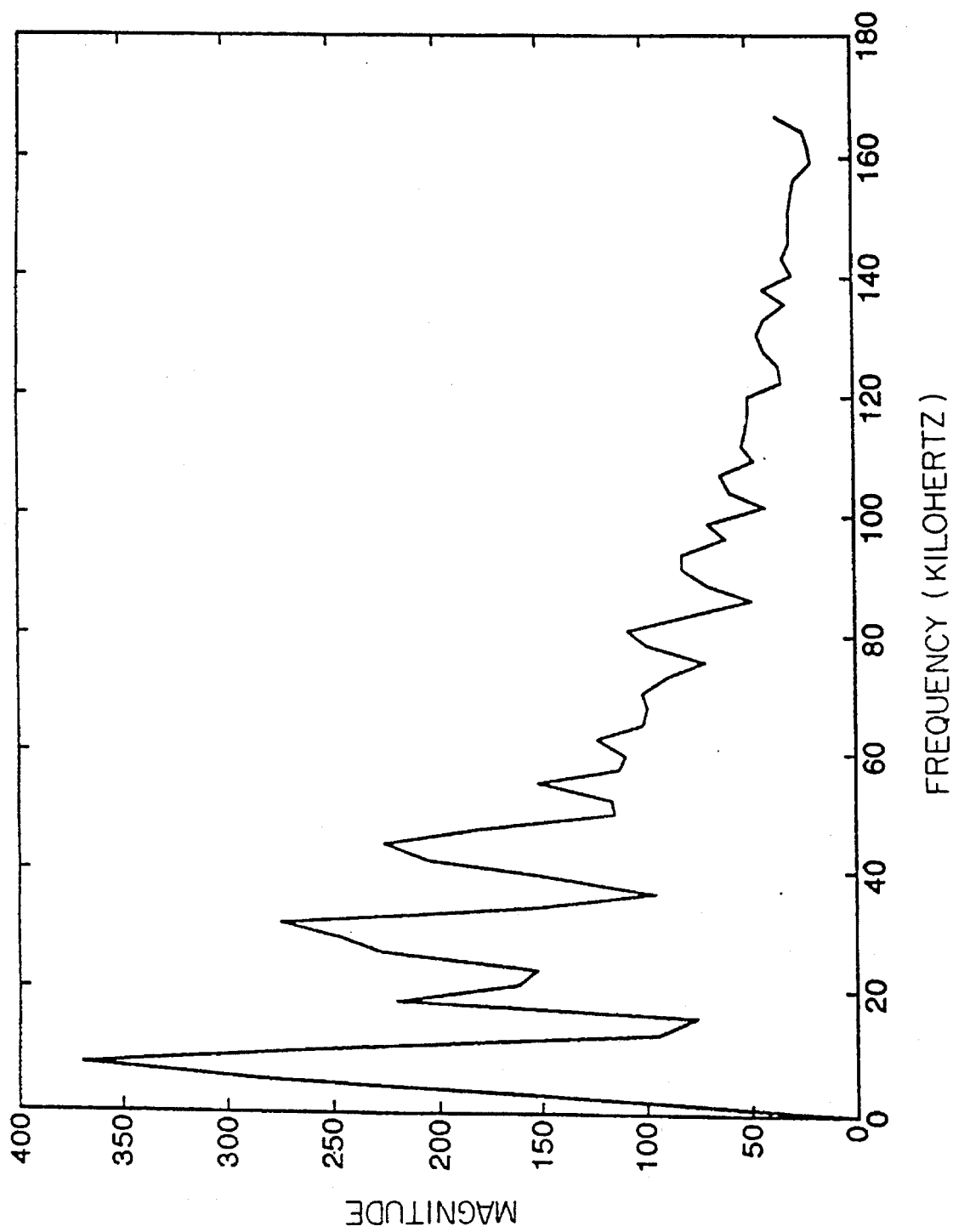
Figure 5D:
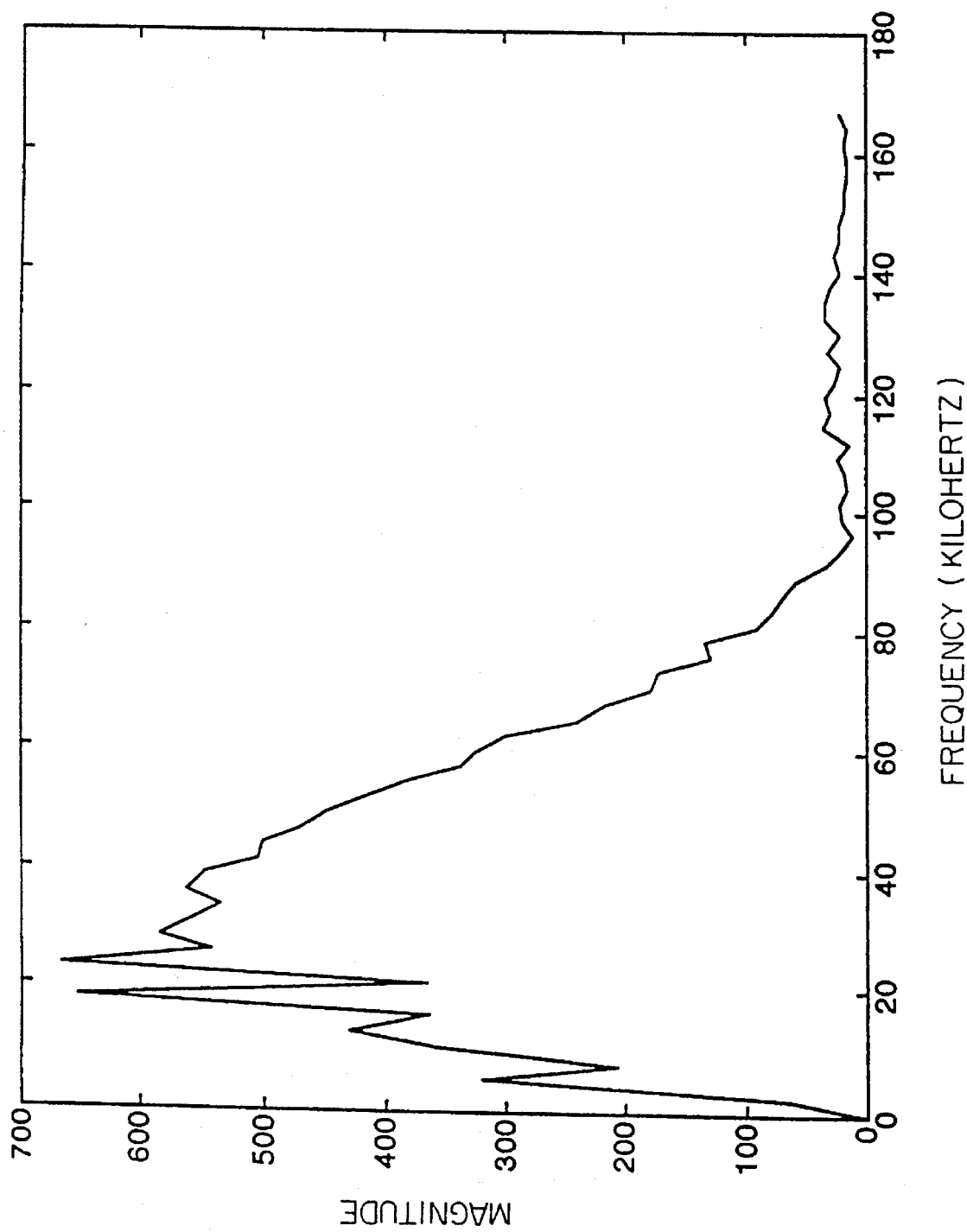

FIGS. 5A–5D each illustrate an exemplary frequency spectrum for a Type 1 through Type 4 waveform, respectively. The frequency spectrum for a Type 1 waveform, as is shown in FIG. 5A, is representative of a monopulse-type waveform and has a relatively sharp peak at 8 to 14 kHz, and decays to half its peak amplitude or less by 25 kHz. FIG. 5B shows the frequency spectrum for a Type 2 waveform indicating significant low frequency oscillation activity. The frequency spectrum of FIG. 5C is representative of the first category of Type 3 waveform. The frequency spectrum is similar to that of FIG. 5A, but having higher frequency components as is characteristic of Type 3 waveforms. FIG. 5D represents an exemplary frequency spectrum for a doublet waveform characteristic of a Type 4 waveform.

Figure 6A:
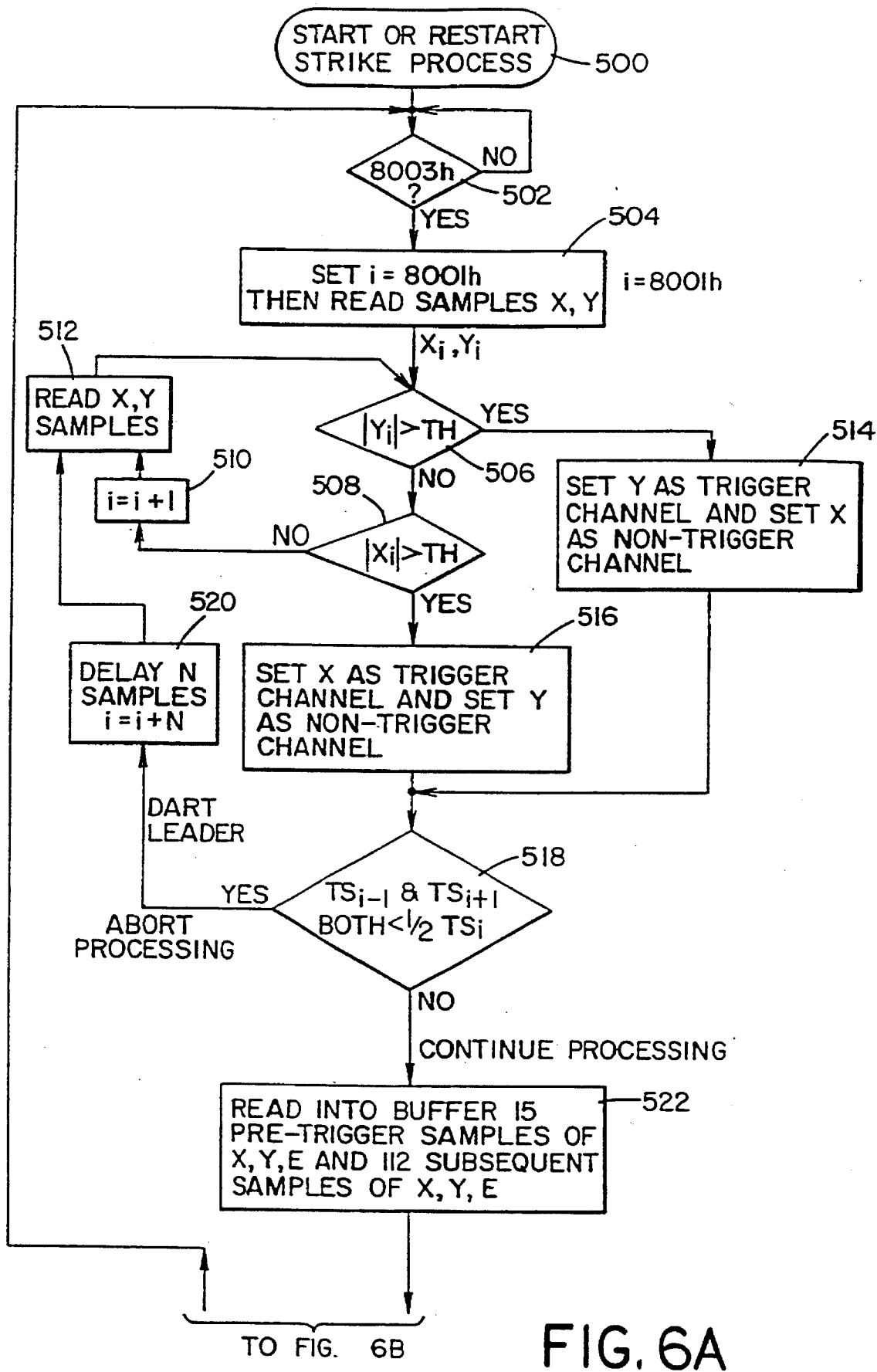

Referring now to FIGS. 6A and 6B, the procedure for acquiring valid strike data as represented in block 142 of FIG. 3 will now be described in detail. The DSP 46, upon receiving an interrupt based on an operator menu selection, for example, commences execution of a routine which may be similar to that exemplified by the flow chart of FIG. 6A starting at block 500. Starting with the flow chart of FIG. 6A, the DSP 46 monitors the address lines of the data acquisition controller 34 until it identifies a predetermined address which may be a predefined address of the waveform RAM 42. In the present embodiment this address is 8003h as determined by the decisional block 502, although it will be appreciated that any other predefined address may be utilized as a practical matter without departing from the scope of the invention. Then, in block 504, an address index is set to 8001h and the sampled and digitized X and Y signals are each read into a buffer memory of the DSP 46 starting at the address 8001h for threshold monitoring thereof. Accordingly, the monitoring of the data samples is performed substantially contemporaneous with the sampling and digitizing of the received waveform signal being only slightly delayed by a relatively small number of sample cycles, e.g. 3 sample cycles.

Continuing with the flow chart of FIG. 6A, in the threshold monitoring process, the absolute values of the data samples $Y_i$ and $X_i$ are compared with a predetermined threshold value in the decisional blocks 506 and 508 to determine if either of them exceeds the threshold value. If neither exceeds the threshold value, the index is incremented by 1 and the X and Y samples associated with the new address index are read in by the block 512 and are retested in the decisional blocks 506 and 508. This process continues until one of the contemporaneous read X or Y samples exceeds the predetermined threshold. Should the Y sample exceed the threshold first as detected by block 506, the Y channel or sampled-data train is set as the trigger channel and the X channel is set as the non-trigger channel in block 514. On the other hand, if the-X sample exceeds the threshold first as determined by block 508, then the X channel or sampled-data train becomes the trigger channel and the Y channel becomes the non-trigger channel as set by the block 516.

In either case, a dart leader test is conducted next by the decisional block 518 using only samples of the trigger channel referred to as TS. In 518, at least one sample $TS_{i-1}$ preceeding the trigger sample $TS_i$ and at least one sample $TS_{i+1}$ succeeding the trigger sample are read and compared with the trigger sample. If both of the preceeding and succeeding samples are determined to be less than a predetermined portion of the trigger sample which in the present embodiment is set to be one half of the trigger sample, then the trigger sample is considered a dart leader and further processing is aborted with an immediate resumption of monitoring the incoming samples for threshold trigger levels. In the present embodiment, processing may be delayed for N samples and the index i is increased by N in the block 520. For the preferred embodiment using a 3 microsecond sampling rate, N is set at 15 samples for a delay of approximately 45 microseconds. After the 15 sample delay, the processing of blocks 512, 506, 508 and 510 is repeated until the next trigger sample is detected. It will be appreciated that the number of samples N can vary in different embodiments based on the sampling rate and/or the desired processing delay.

If the trigger sample is determined not to be a dart leader in 518, then the processing is continued at the block 522 wherein 15 pre-trigger samples and 112 subsequent samples of each of the channels X, Y and E are read into a buffer from the waveform memory 42 by the DSP 46. Accordingly, the DSP 46 has collected in a data sample buffer 128 samples, including the recovery of 15 prethreshold samples, of each of the sampled data trains representative of a detected lightning strike pulse-like waveform. Next, in the instructional block 524 shown in FIG. 6B, a pulse width of the detected lightning strike waveform is calculated. A suitable routine for performing the pulse width calculation is depicted by the flow chart of FIG. 7.

Referring now to FIG. 7, the pulse width routine is entered at block 530 and caused to search each of the samples in the designated trigger channel buffer starting from the trigger sample $TS_i$ to find a first local maximum thereof in block 532. The sample associated with the local maximum is multiplied by some pre-determined constant to establish an amplitude cutoff level in block 534. For the present embodiment, the constant may be chosen at 0.2. Next, in block 536, the routine counts the number of samples of the trigger channel buffer having amplitudes in excess of the amplitude cutoff level on both sides of the local maximum. Next, in block 538, a pulse width PW is set equal to the number of counted samples and the routine is returned to the primary routine of FIGS. 6A and 6B.

Upon return to the main routine of FIG. 6B, the calculated pulse width $PW_c$ from block 524 is saved for subsequent processing in a buffer and also compared with a pulse width threshold $PW_{TH}$ in the decisional block 540. If the calculated pulse width is below the threshold setting, the represented lightning strike thereof is considered invalid and processing is aborted and the routine is diverted back to the decisional block 502. Otherwise, a correlation is next performed in the block 542 to further determine lightning strike validity. A suitable routine for processing the X, Y and E samples from the buffer to perform a correlation test thereof is exemplified by the software flow chart of FIG. 8.

Figure 8:
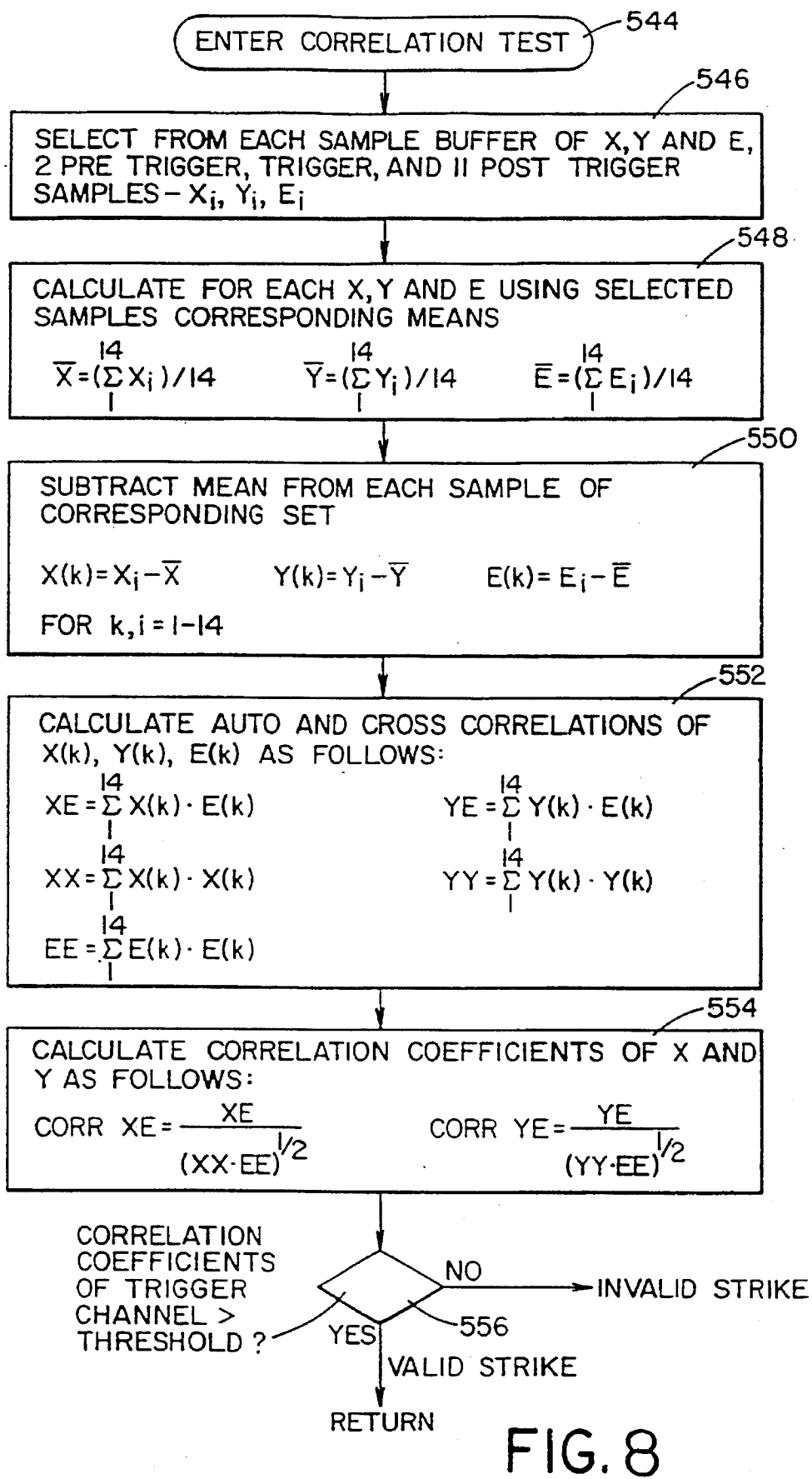
FIG. 8 is a software flow chart suitable for programming the DSP to test the correlation between the respective X, Y and E components of the detected signal.

Referring to FIG. 8, the correlation test routine is entered at block 544 and the next block 546 is executed to select from each of the X, Y and E sample buffers data samples representative of the of the lightning strike waveform which includes a pulse shaped portion and a trailing shaped portion. In the present embodiment, 2 pre-trigger, the trigger and 11 post trigger samples are selected from each buffer and designated as $X_i$, $Y_i$ and $E_i$. The selected samples are substantially coherent with and are intended to cover the time interval including the pulse shaped portion of the trigger signal waveform and are not intended to include the trailing portion thereof. In block 548, a mean is calculated for each of the sample groups yielding X, Y and E. Thereafter, in block 550, a new sample set X(k), Y(k), and E(k) is calculated by subtracting the samples of each group from their corresponding calculated mean. Next, auto and cross correlations are calculated from the new set of samples X(k), Y(k), and E(k) in accordance with the instructions of block 552. In block 554, correlation coefficients of the X and Y channels are computed as a function of the auto and cross correlations determined in block 552. The correlation coefficient XE is computed in the present embodiment by dividing the cross correlation of X and E with the square root of the product of the auto correlations of X and E. Similarly the correlation coefficient YE is effected by dividing the cross correlation of Y and E with the square root of the product of the auto correlations of Y and E. The signs of the correlation coefficients XE and YE are stored in a buffer memory.

It will be noted that the number of samples selected in block 546 and the limits included in the summations in FIG. 8 are based on a sampling period of approximately 3 microseconds. The exact number of selected samples and the corresponding summation limits may be different in other embodiments, depending primarily on the sampling rate of the system. The objective is to evaluate the correlation based on the sampled data during the time interval including the pulse shaped portion of the trigger signal waveform.

To determine whether the instant lightning strike represented by the collected samples is a valid or invalid strike, the correlation coefficient of the trigger channel is compared to a threshold value in the decisional block 556. If determined to be less than the threshold value, the correlation is considered insufficient and the strike data is considered invalid in which case the processing is aborted and the routine is diverted back to the decisional block 502 (FIG. 6A). Otherwise, the strike data is considered valid, the lightning strike considered detected, and full processing thereof is commenced starting at block 560 in the flow chart of FIG. 9.

Figure 9:
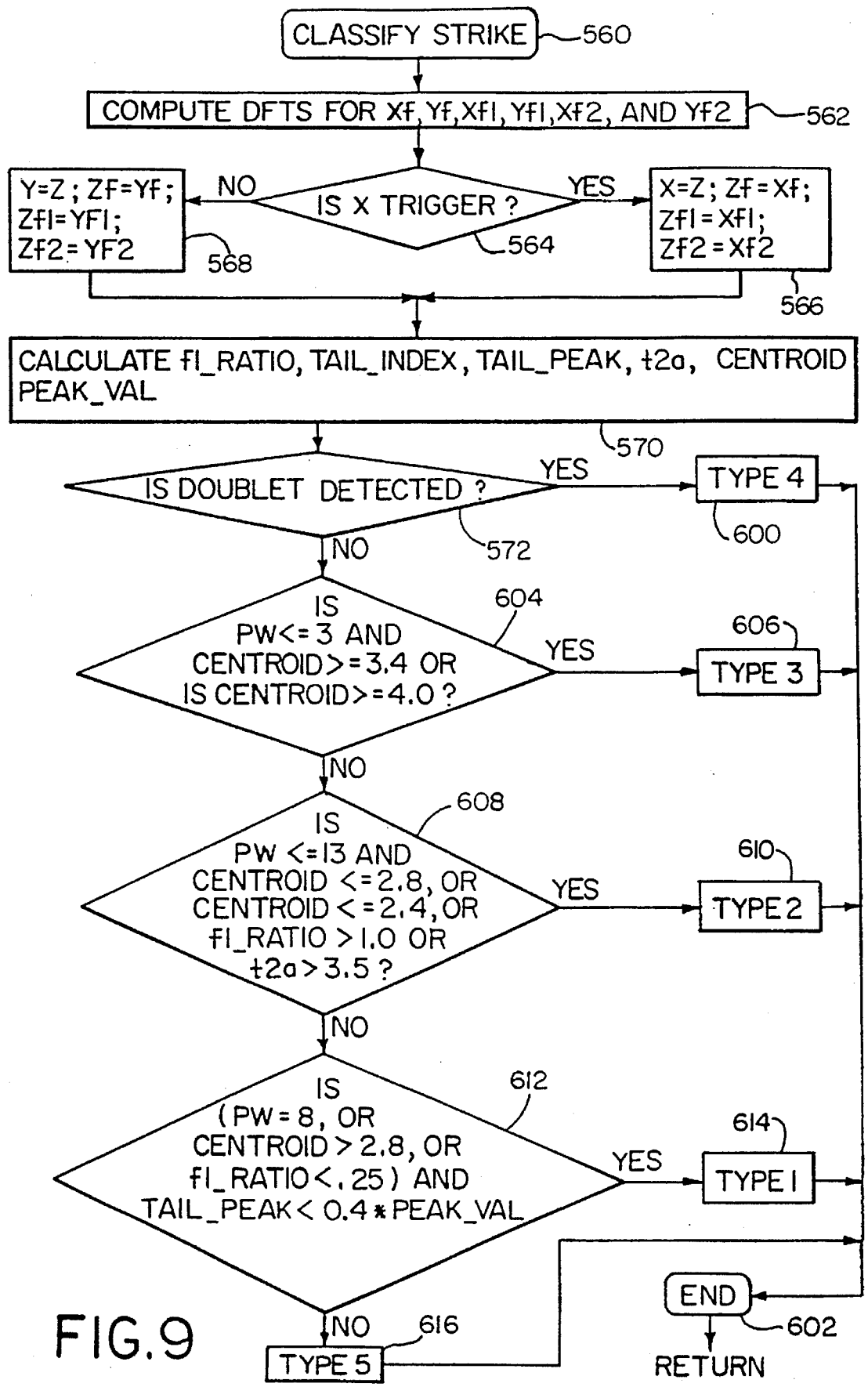
FIG. 9 is a software flow chart suitable for programming the DSP to classify the input signal waveform.
Figure 10A:
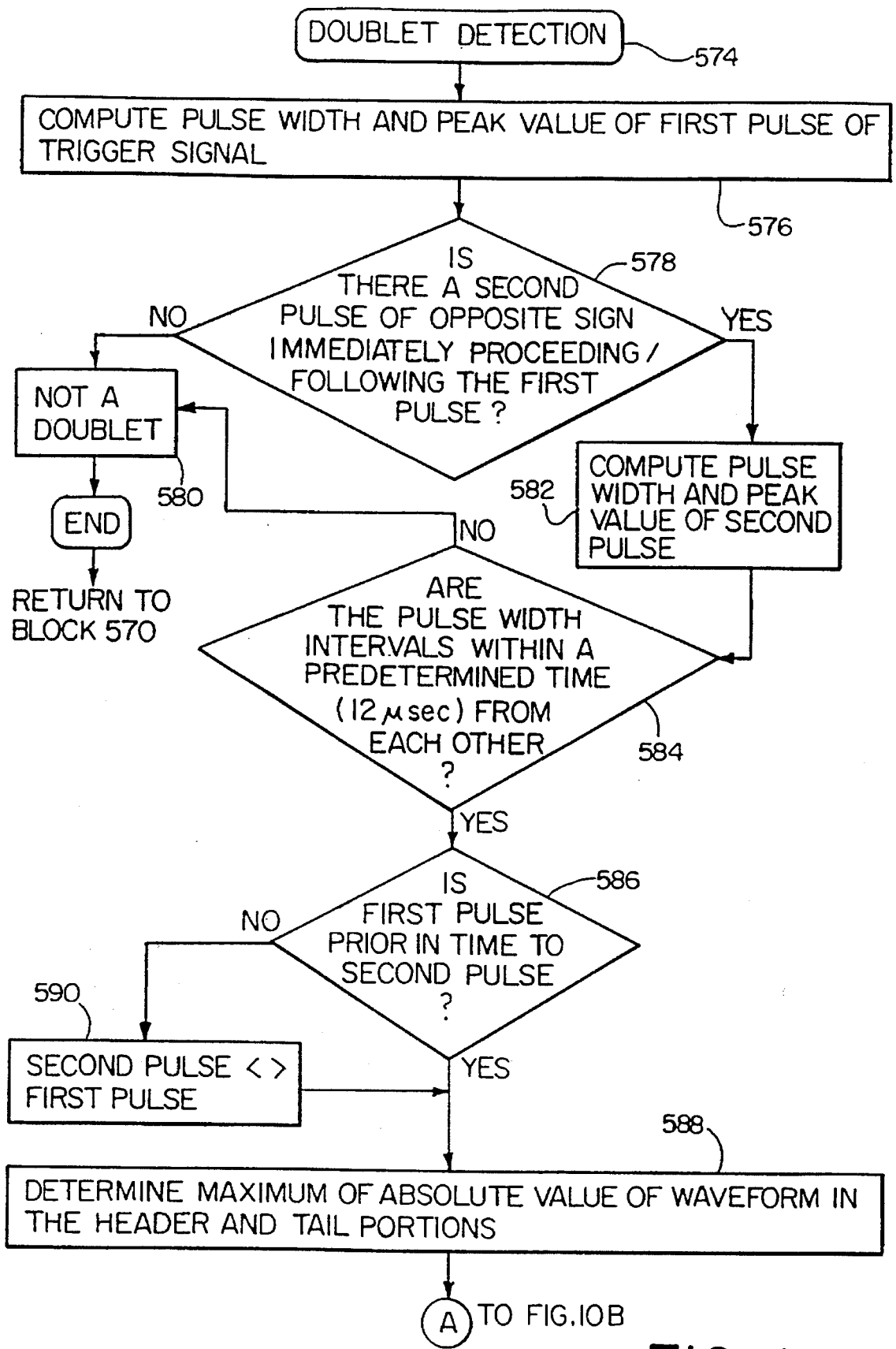
FIG. 10 is a software flow chart suitable for programming the DSP to determine whether the input signal waveform is a doublet.
Figure 10B:
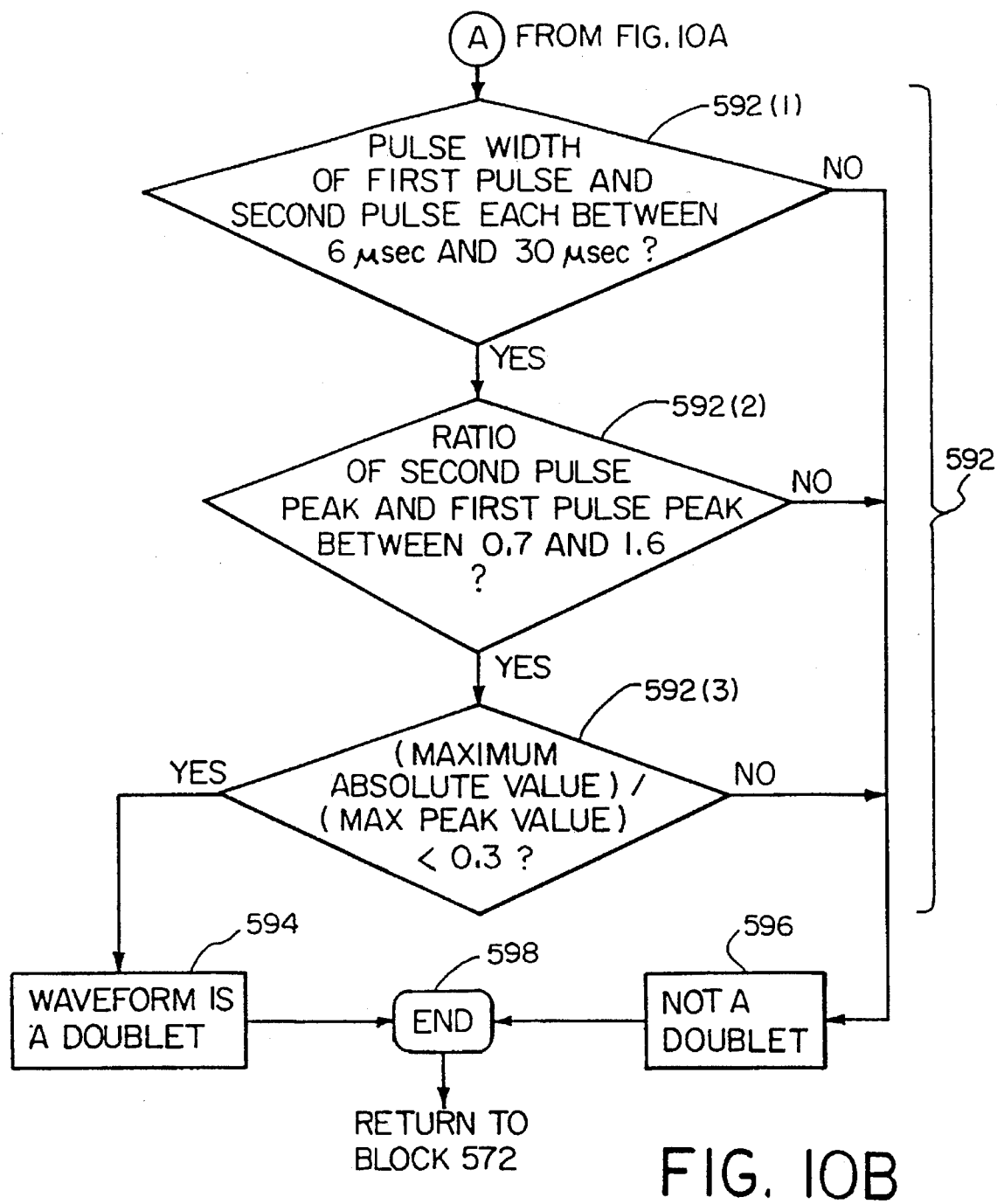

FIGS. 9 and 10 are flow charts representing the programmed steps for processing and classifying the acquired strike data in accordance with block 144 of FIG. 3. Beginning with block 560 in FIG. 9, the system initiates the procedure for classifying the lightning strike. In block 562, the DSP 46 computes the Fourier Transforms, and most preferably the discrete Fourier Transforms (DFTs) of the X component and Y component signals. More particularly, the DSP 46 computes the DFT of all 128 samples in each of the X and Y signals to form Xf and Yf, respectively. The DSP 46 also computes the DFT of the first 64 samples (first with respect to time) of each of the X and Y signals to form Xf1 and Yf1, respectively. These first 64 samples preferably cover the time interval from about 50 microseconds before to 150 microseconds after a magnitude threshold of the respective waveform has been exceeded (e.g., at trigger sample $TS_i$). Thus, these samples contain the bulk of the energy of the transient lightning signal as will be appreciated.

Furthermore, the DSP 46 in block 562 calculates the DFT of the last 64 samples of each of the X and Y signals to form Xf2 and Yf2, respectively. These last 64 samples represent primarily the tail activity associated with the lightning strike. FIGS. 11A–11C provide examples of DFTs for the X signal representing Xf, Xf1 and Xf2, respectively. The DFTs for the Y signal would be similar. In the preferred embodiment, only the absolute value of each DFT frequency component is considered. Moreover, only the positive frequency components generated by the DFTs are considered. The negative frequency components (not shown) are simply the complex-conjugates of the corresponding positive frequency components. The value of each frequency component in the DFTs for all 128 samples, the first 64 samples, and the second 64 samples is represented by Xf(k), Xf1(k) and Xf2(k), respectively, where k represents the DFT bin index. In the exemplary embodiment, each DFT frequency component bin is centered at approximately $(k-1) * 5.2$ kilohertz (kHz).

Referring again to FIG. 9, the system determines in decision block 564 whether the X channel was designated the trigger channel (block 51 6 of FIG. 6B) indicating that the X signal is the larger of the X and Y signals. If yes, the system proceeds to block 566 wherein the variable sets Z, Zf, Zf1 and Zf2 are defined as follows:

$$Z=X;\ Zf=Xf;\ Zf1=Xf1;\ \text{and}\ Zf2=Xf2.$$

If, on the other hand, the X channel is not the trigger channel, the system proceeds to block 568 wherein the variable sets Z, Zf, Zf 1 and Zf2 are defined as follows:

$$Z=Y;\ Zf=Yf;\ Zf1=Yf1;\ \text{and}\ Zf2=Yf2.$$

Subsequent to both blocks 566 and 568, the system continues to block 570 in which the DSP 46 computes the values for the following functions:

fl__ratio=Zf2(2)/max(Zf1(2:4));

tail__index=min(stop1+6, 128);

tail__peak=max(abs(Z(tail__index:1.28)));

t2a=(Zf1(2)+Zf1(3))/max(Zf1(4:10);

centtold=((1:7) * Zf1(2:8))/(ones(1,7) * Zf1(2:8)); and peak__val=max(abs(Z))

where

"max(Zf1(2:4))" is equal to the maximum absolute value of the DFT frequency components present in Zf1 (2) through Zf1 (4), e.g., in the range of 5.2 kHz to 15.6 kHz;

"stop1" is equal to the index of the data sample of the trigger channel at which the trigger channel signal falls below the cut-off level established in block 534 of FIG. 7, indicating the falling edge of the trigger pulse;

"min(stop1+6, 128)" is equal to either the stop 1 index plus 6, or 128, whichever is smaller;

"max(abs(Z(tail__index: 128)))" is equal to the maximum absolute value of the data samples in the trigger channel in the range beginning with the data sample found at the tail__index and ending with the last data sample in the sampled waveform;

"max(Zf1(4:10))" is equal to the maximum absolute value of the DFT frequency components present in Zf1(4) through Zf1(10), e.g., in the range of 15.6 kHz to 46.8 kHz;

"(1:7) * Zf1(2:8)" is equal to the summation Σk*Zf1(k+1), for k equals 1 to 7;

"(ones(1,7) * Zf1(2:8))" is equal to the summation ΣZf1(k+1), for k equals 1 to 7; and "max(abs(Z))" is equal to the maximum absolute value of the data samples in the trigger signal.

The system proceeds to block 572 after storing in memory the values calculated in block 570. In block 572, the system determines whether or not the acquired strike data represents a doublet waveform. If a doublet is detected, the lightning strike is classified as a Type 4 intracloud lightning strike. The primary significance of classifying lightning as intracloud is the subsequent ability to estimate the range of the lightning waveform. Intracloud lightning is typically weaker than cloud-to-ground lightning. Thus, a close intracloud lightning waveform is of similar energy to a more distant cloud-to-ground waveform. By classifying a lightning waveform as an intracloud stroke associated with a Type 4 waveform, the present invention is able to estimate more accurately its range.

A suitable software flow chart for programming the DSP 46 to carry out such a doublet determination is shown in FIG. 10 beginning with block 574. For sake of example, the process for identifying a doublet waveform will be described with reference to FIG. 4D. In block 576, the DSP 46 computes the pulse width PW1 and peak value PEAK1 of the first pulse in the trigger channel signal. The first pulse is considered to be the pulse in the waveform which includes the trigger sample TS and local maximum referred to in block 532 of FIG. 7. The pulse width in the exemplary embodiment is defined as the time interval in which the pulse is greater than some fraction F of its peak absolute value PEAK 1. This fraction F can be 0.2 as in the case of block 534 of FIG. 7. Alternatively, some other fraction such as 0.25 or some other value can be used without departing from the scope of the invention.

In decision block 578, the DSP 46 analyzes the trigger channel data samples adjacent the first pulse to determine, based on another local maximum, whether a second pulse of opposite sign to the first pulse is either immediately preceeding or immediately following the first pulse. If such a second pulse of opposite :sign does not exist, the trigger channel waveform is considered not to be a doublet waveform (block 580). On the other hand, if such a second pulse does exist the system proceeds to block 582 in which the DSP 46 calculates the pulse width PW2 and peak absolute value PEAK2 of the second pulse (See FIG. 4D). In the event a pulse of opposite :sign exists both immediately preceeding and immediately following the first pulse, the DSP 46 views the pulse having the largest absolute peak value as being the second pulse.

The DSP 46 in decision block 584 determines whether the pulse width intervals PW1 and PW2 are within a predetermined time period Tp of each other. In the present embodiment, Tp is equal to 12 microseconds. If the first and second pulses; do not occur within 12 microseconds of each other, the trigger channel waveform is eliminated as a possible doublet waveform and the system proceeds to block 580.

If the first and second pulses do occur within 12 microseconds of each other, the system proceeds to block 586. In block 586 the DSP 46 determines whether the first pulse or the second pulse occurs first in time. It will be appreciated that the trigger sample in the trigger channel signal may occur in the second in time pulse in the event the magnitude of the first in time pulse is less than that of the second in time pulse. If the first pulse does in fact occur first in time, the system proceeds directly to block 588. Otherwise, the system proceeds to block 590 in which the DSP 46 exchanges the values of PW1 and PEAK1 with the values of PW2 and PEAK2, respectively, and the system proceeds to block 588. Thus, in block 588 the PW1 and PEAK1 values and the PW2 and PEAK2 values respectively correspond the first in time pulse and second in time pulse relative to each other.

In block 588, the DSP 46 identifies header and tail portions H and T (FIG. 4D), respectively, of the waveform. The header portion H consists of those waveform data samples preceeding the data sample which represents the beginning of the first pulse width interval PW1. The tail portion T consists of all of the remaining waveform data samples beginning a predetermined number of samples (e.g., 20 samples) following the end of the second pulse width interval PW2. The DSP 46 proceeds in block 588 with determining the maximum absolute value of the waveform data samples within the header and tail portions H and T, i.e., outside the first and second pulse intervals.

The system then continues to block 592 in which a predetermined set of criteria is applied to the trigger channel information derived above in order to determine if the signal is a doublet waveform. An exemplary set of criteria will now be described, although it will be appreciated that various different criteria could be used in a different embodiment. First, the DSP 46 determines whether the first and second pulse width intervals PW1 and PW2 are within the range of 6 microseconds to 30 microseconds (block 592(1)). If either of the first or second pulse width intervals PW1 or PW2 is outside of this range, the waveform is more likely than not either too high in frequency or too low in frequency to qualify as a doublet waveform produced by a lightning strike.

Second, the DSP 46 determines if the ratio PEAK2/PEAK1 is approximately equal to one, or more preferably is within the range of 0.7 to 1.6 (block 592(2)). A PEAK2/PEAK1 ratio which is in the range of 0.7 to 1.6 has been found to be satisfactorily close to a prototypical doublet to be considered as a possible doublet waveform.

Third, the DSP 46 takes the maximum absolute value of the waveform in the header and tail portions H and T as determined in block 588 and divides it by either PEAK1 or PEAK2, whichever is larger (block 592(3)). This provides a ratio comparing the activity of the waveform outside of the pulse intervals to the activity within the pulse intervals. The DSP 46 then determines whether the ratio is less than a predetermined value (e.g., 0.3). A small ratio indicates little activity in the waveform outside of the pulse intervals, which is characteristic of a doublet waveform.

In the event each of the above three criteria is met in block 592, the system proceeds to block 594 in which the lightning strike signal is identified as being a doublet waveform. If one or more of the criteria in block 592 is not satisfied, on the other hand, the system proceeds to block 596 in which it is concluded that the, lightning strike signal is not a doublet waveform. Following blocks 594 and 596, the system completes the doublet detection routine in block 598.

Referring again to block 572 of FIG. 9, if the DSP 46 has determined that the lightning strike is a doublet waveform, the system proceeds to block 600 in which the system classifies the lightning strike as being a Type 4 waveform. The system then continues to block 602 in which the system ends the strike classification routine and returns to block 144 of FIG. 3. If the lightning strike signal is determined not to be a doublet waveform in block 572, however, the system proceeds to block 604 in which another set of criteria is applied to the lightning strike data.

More particularly, the DSP 46 is programmed to check in block 604 whether the lightning strike data meets the following additional criteria to determine if the lightning strike data represents a Type 3 waveform:

(a) $PW \leq 3$ AND centroid$\geq 3.4$;
OR
(b) centroid$\geq 4.0$ where PW is the pulse width value calculated in block 538 of FIG. 7, and centroid is the frequency centroid value of the DFT below approximately 40 kHz as calculated in block 570 of FIG. 9.

Criteria (a) and (b) above are intended to identify whether the frequency centroid of the detected waveform in the range below approximately 40 kHz is relatively large compared to Type 1 waveforms. Criteria (a) and (b) represent a two-stage test. Under criteria (a), if the pulse is narrow (e.g., less than approximately 10 microseconds) and the frequency centroid is relatively high (e.g., approximately 17.7 kHz), the waveform is considered to be a Type 3. Under criteria (b), if the frequency centroid is high (e.g., greater than 20.8 kHz), the waveform is considered to be a Type 3 waveform regardless of the pulse width. This latter condition often discriminates the "messy" category of Type 3 waveforms that have no dominant peak. In the event either criteria (a) or (b) is satisfied in block 604, the system proceeds to block 606 in which the lightning strike data is identified as representing a Type 3 waveform.

If neither criteria (a) nor (b) is satisfied in block 604, the system proceeds to block 608 where it determines if any of the following additional criteria are met:

(c) $PW \geq 13$ AND centroid$\leq 2.8$
OR
(d) centroid$\leq 2.4$
OR
(e) fl_ratio$>1.0$
OR
(f) t2a$>3.5$ Criteria (c) checks for whether the waveform has a wide pulse width (e.g., greater than approximately 40 microseconds) and a low frequency center of gravity (e.g., approximately 14.5 kHz or less). If so, the signal is considered to be a Type 2 waveform. Alternatively, under criteria (d) the system determines whether the frequency center of gravity is approximately 12.5 kHz or less. If so, the signal is considered a Type 2 waveform regardless of the pulse width. According to criteria (e), the system checks whether the frequency content at the first nonzero frequency DFT bin (e.g., 5.2 kHz) compared to the maximum frequency content of the first three non-zero frequency DFT bins (e.g., 5.2, 10.4 and 15.6 kHz, respectively) is greater than 1, thereby indicating a large low frequency content. Under criteria (f), the system determines whether the ratio of the frequency content represented by the summation of the first two non-zero frequency DFT bins as compared to the maximum of the third through ninth non-zero frequency DFT bins is greater than 3.5. If any one or more of criteria (c) through (f) are satisfied, the system identifies the waveform as being a Type 2 waveform as shown in block 610. Otherwise, the system proceeds to block 612.

Various specific criteria have been presented herein for classifying the different types of waveforms. It will be understood, however, that other criteria could be used in another embodiment without departing from the scope of the invention. For example, another possible test for determining whether the characteristics of a Type 2 waveform are present is to check whether the peak of the main pulse in the waveform lies near the center or the right of the pulse width, rather than in the left portion of the pulse width. Such a characteristic is believed to be associated with a Type 2 waveform.

In the event the trigger signal waveform has not been classified as either a Type 4, 3, or 2 waveform, the system proceeds to block 612. The system in block 612 determine; whether the waveform is of Type 1. For example, the system determines if the following additional criteria are met:

(g) $PW \leq 8$
OR
(h) centroid$>2.8$
OR
(i) fl_ratio$<0.25$
AND
(j) tail_peak$<0.4*$peak_val Criteria (g) determines whether the pulse width is approximately equal to or less than the maximum pulse width characteristic of a Type 1 waveform (e.g., less than approximately 25 microseconds). Under criteria (h), the system checks whether the center of gravity of the frequency response in the range below about 40 kHz is greater than about 14.5 kHz. According to criteria (i), the system checks whether the relative frequency content at the first non-zero frequency DFT bin (e.g., 5.2 kHz) as compared to the maximum of the first three non-zero frequency DFT bins (e.g., 5.2, 10.4 and 15.6 kHz, respectively) is less than 0.25. Criteria (j) checks whether the peak value of the tail of the waveform is less than 40% of the waveform peak value.

In the event either criteria (g), (h) or (i) is satisfied and criteria (j) is also satisfied, the system proceeds to block 614 wherein the system identifies the waveform as being a Type 1 waveform. If the waveform does not meet the criteria for a Type 1 waveform, the system proceeds from block 612 to block 616 in which the waveform is identified as a Type 5 waveform. Thus, the system classifies a waveform as Type 5 if it is deemed to be a valid waveform but it is not classified as either a Type 1, Type 2, Type 3 or Type 4 waveform in one of the previous blocks.

After the system classifies the waveform according to the procedure exemplified in FIG. 9, the system proceeds to block 146 of FIG. 3 in which the system estimates the range and bearing of the detected lightning strike. The software flow chart for programming the DSP 46 to carry out such estimations is shown in FIG. 12 beginning with block 620. The system proceeds to block 622 where at a set of range weights W1 through W7 is determined based on the previously determined strike classification. In the present embodiment, each set of weights depends on the strike type and the respective weights are designed to correspond to the first seven non-zero frequency components (k=2 through k=8) of the previously calculated DFT. In the present embodiment, the set or vector of range weights (W1, W2, W3, W4, W5, W6, W7) for the five types of waveforms is determined as follows:

Type 1: (0.4, 0.4, 0.2, 0.0, 0.0, 0.0, 0.0)
Type 2: (0.5, 0.3, 0.2, 0.0, 0.0, 0.0, 0.0)
Type 3: (0.3, 0.3, 0.4, 0.0, 0.0, 0.0, 0.0)
Type 4: (0.3, 0.3, 0.4, 0.0, 0.0, 0.0, 0.0)
Type 5: (0.4, 0.4, 0.2, 0.0, 0.0, 0.0, 0.0)

As will be appreciated, the highest weights in each vector are used on the peak spectral energy components of the lightning signals according to type.

Next, in block 624 a bearing weight vector (Wb1, Wb2, Wb3, Wb4, Wb5, Wb6, Wb7) is determined for estimating the bearing of the lightning strike. The respective bearing weights within the vector are also designed to correspond to the first seven non-zero frequency components (k=2 through k=8) of the previously calculated DFT. In the present embodiment, the bearing weight vector is the same for each type of waveform and is represented by (1, 1, 0.5, 0.0, 0.0, 0.0, 0.0). However, it will be appreciated that other weight vectors may be employed which may or may not be dependent on the waveform type without departing from the scope of the invention.

In block 626, the DSP 46 calculates the range and bearing of the detected lightning strike based on the selected weight vectors. In particular, the selected weights W1–W7 are used to compute range weight sums OXr and OYr from the yielded bin components of the DFTs for the X and Y channels (Xf and Yf, respectively) as follows:

$$OXr = W1*Xf(2) + W2*Xf(3) + W3*Xf(4) + W4*Xf(5) + W5*Xf(6) + W6*Xf(7) + W7*Xf(8), \text{ and}$$
$$OYr = W1*Yf(2) + W2*Yf(3) + W3*Yf(4) + W4*Yf(5) + W5*Yf(6) + W6*Yf(7) + W7*Yf(8),$$

where the "*" symbol in the above equations represents a multiplication operation in each case. Accordingly, OXr and OYr are the weighted sums for the X and Y channels, respectively.

A range r is then estimated in block 626 from the weighted sums OXr and OYr based on an inverse relationship as follows:

$$r=1/SQRT(OXr^2+OYr2),$$

where "SQRT" represents the square root operator.

The weighted sums OXb and OYb for calculating the bearing of the lightning strike based on the X and Y channels using the above-mentioned bearing vector also are calculated in block 626 as follows:

$$OXb = Wb1*Xf(2) + Wb2*Xf(3) + Wb3*Xf(4) + Wb4*Xf(5) + Wb5*Xf(6) + Wb6*Xf(7) + Wb7*Xf(8), \text{ and}$$
$$OYb = Wb1*Yf(2) + Wb2*Yf(3) + Wb3*Yf(4) + Wb4*Yf(5) + Wb5*Yf(6) + Wb6*Yf(7) + Wb7*Yf(8)$$

The estimated bearing e is then computed as follows:

$$\theta=arctan\ (OXb/OYb) * 180/\pi.$$

Still in block 626, the proper quadraint of the bearing is selected based on the correlation coefficients XE and YE computed from the flow chart of FIG. 8, for example. The bearing estimate θ is corrected to form corrected estimate θ' based on the selected quadrant utilizing the following equations:

if CORR XE is less than 0 and CORR YE is greater than 0, then $$\theta'=360-\theta,$$

else if CORR XE is less than 0 and CORR YE is less than 0, then
$$\theta'=\theta+180,$$
else if CORR XE is greater than 0 and CORR YE is less than 0, then $$\theta'=180-\theta.$$

Proceeding to block 628, the system determines a corrected range estimation r' based on a range correction factor. In the preferred embodiment, the range correction factor is represented by a correction function g(r,type) which is dependent upon the uncorrected range r and/or the type of the detected lightning strike. Thus, the corrected range estimation r' can be calculated as follows:

$$r'=g(r,\ type)*r$$

The function g(r, type) can be a linear function or a non-linear function. For example, in one embodiment the range correction factor g(r,type) is a linear function defined as follows:

$$g(r,type)=knm * TYPE,$$

where knm is a constant for converting the range value to nautical miles, e.g., knm=9100, and TYPE is a function variable whose value is dependent on the type of waveform identified in block 144 of FIG. 3. For a Type 1 waveform, TYPE=1.0; for a Type 2 waveform, TYPE=1.25; for a Type 3 waveform, TYPE=0.5; for a Type 4 waveform, TYPE=0.5; and for a Type 5 waveform, TYPE=1.0. The particular TYPE values associated with the different type waveforms have been preselected based on studies by the inventors. In particular, it has be found that Type 2 waveforms tend to have an amplitude that is approximately 1.25 times the amplitude of Type 1 waveforms at the same range. Similarly, Type 3 through Type 5 waveforms tend to have an amplitude that is approximately 0.5, 0.5 and 1.0 times, respectively, the amplitude of a Type 1 waveform at the same range.

FIGS. 13A–13D illustrate the range correction function g(r, type) for a different embodiment of the invention in which non-linear correction is performed. For example, the applicants have determined based on ongoing studies that Type 2 waveforms rarely are detected at ranges of less than 70 nautical miles (nm). In addition, Type 4 waveforms rarely are detected at ranges of more than 30 nm. Type 3 waveforms are detected with higher probability at closer ranges (e.g., 0 to 40 nm) rather than at more distant ranges (e.g., 40–100 nm), and rarely at ranges greater than 80 nm. Type 1 waveforms have been found to exhibit no significant range dependencies.

Figure 13A:
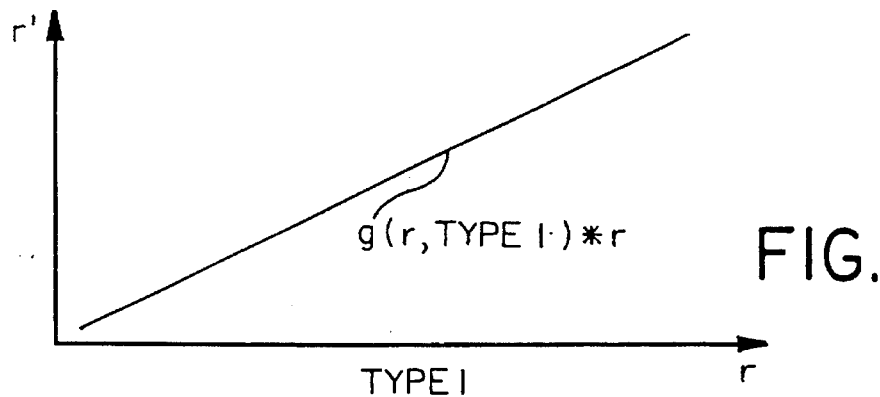
FIGS. 13A–13D are exemplary range correction functions for Type 1 through Type 4 waveforms, respectively, suitable for programming the DSP to calculate the range of the lightning strike.
Figure 13B:
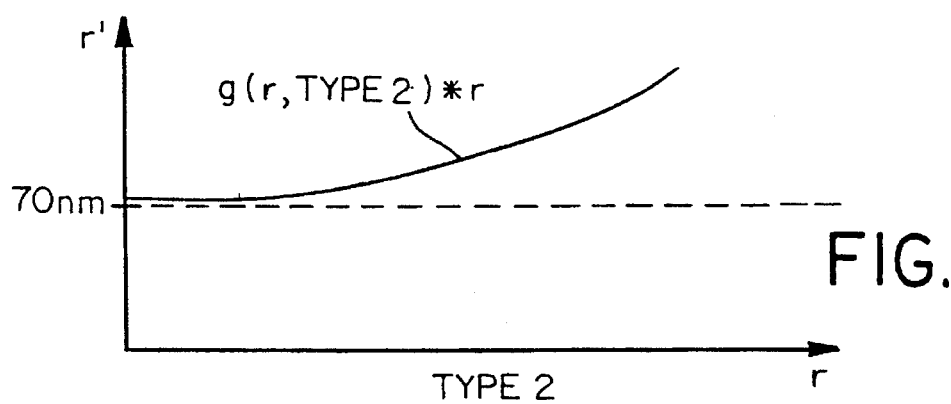
Figure 13C:
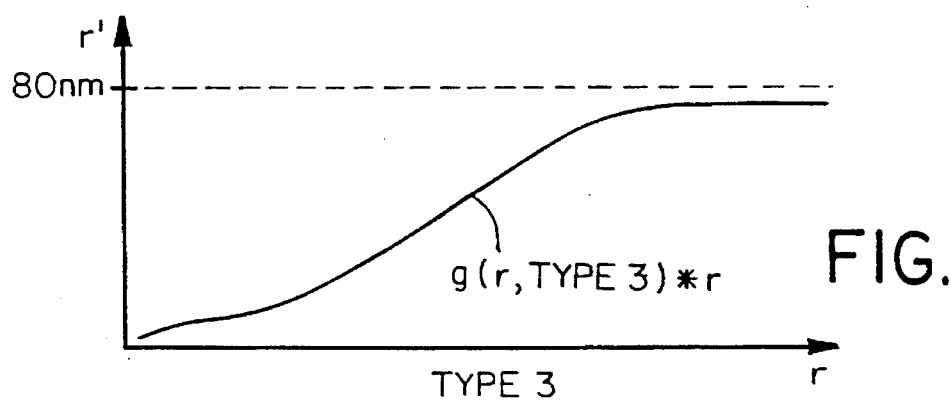
Figure 13D:
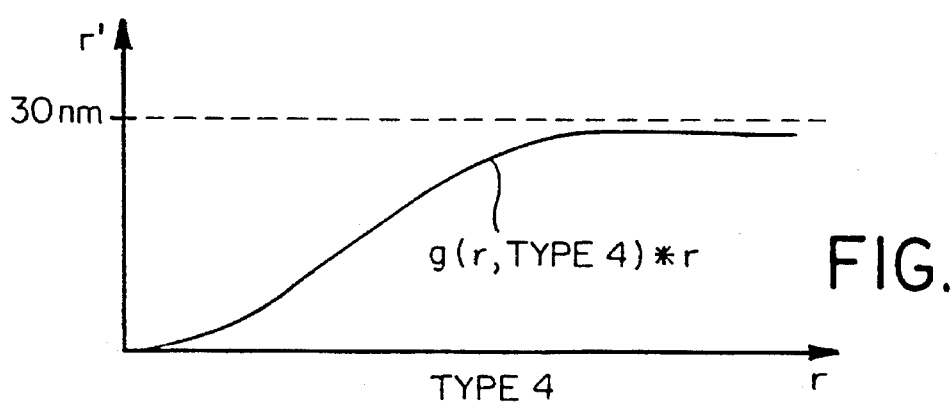

FIG. 13A shows an exemplary correction function g(r, type) for a Type 1 waveform. It is noted that the correction function exhibits little range dependency. FIG. 13B shows an exemplary correction function for a Type 2 waveform whereby the corrected range r' is limited to a minimum of 70 nm. FIG. 13C shows a correction function for a Type 3 waveform. As can be seen, the corrected range r' is limited to 80 nm. FIG. 13D shows an exemplary correction function for a Type 4 waveform whereby the corrected range r' is limited to 30 nm. The correction function for a Type 5 waveform is not shown but preferably is similar to that of a Type 1 waveform.

It is noted that the correction function g(r,type) as exemplified in FIGS. 13A–13D can be a function of knowledge obtained through the study of lightning strikes. This knowledge can be used to form a set of rules which the system is programmed to implement in order to produce the corrected range determination r'. Certain predefined limits are utilized in accordance with the correction functions shown in FIGS. 13A–13D based on the known characteristics of the present invention according to its preferred embodiment. However, these limits can be different in different embodiments. For example, a system having greater sensitivity with respect to detecting the lightning strikes may be able to identify Type 3 waveforms at ranges greater than 80 nm. Thus, the particular limits used by the system in block 628 are preferably determined experimentally or empirically based on the system sensitivity.

Referring back to FIG. 3, the system proceeds to block 148 after calculating the corrected range and bearing for the lightning strike in the above described manner. Block 148 represents an optional process carried out by the system for further correcting the range calculation based on tail activity in the detected waveform. Tail activity refers to the activity of a lightning strike signal beyond the main pulse thereof. It has been found that measurable tail activity is normally associated with lightning strokes relatively close to the measurement system. This is believed to be because the lightning discharge activity after the main pulse is relatively smaller in magnitude and the fields associated therewith are normally dissipated at long ranges. Accordingly, if the tail activity can be measured by the system, it is an indication that the lightning stroke was relatively nearby.

The lightning strike detection and mapping system of the present invention detects the tail activity of one or more of the different types of waveforms and uses information derived therefrom to correct further the range calculation performed in block 146 of FIG. 3. This aspect of the present invention has particular application when the system is part of a ground lightning detection station where it is important to know when lightning is striking the ground nearby. In contrast, when the system is used as part of an aircraft the system is intended primarily to monitor lightning strikes at a distance in order to avoid the severe turbulence of thunderstorms associated therewith.

A suitable software flow chart for programming the DSP 46 to perform tail activity based correction is shown in FIG. 14 beginning at block 640. In block 642, the system checks whether the detected lightning stroke is a Type 1 or a Type 3 waveform as determined in block 144 of FIG. 3. As can be seen from FIGS. 4A and 4C, Type 1 and Type 3 waveforms typically consist of a main pulse or "bang" with a very small signal component in the tail section following the main pulse. Type 2 and 5 waveforms typically do not have such a discernible tail section and therefor tail activity analysis is not considered as useful.

Accordingly, if in block 642 the waveform is found to be a Type 1 or Type 3 waveform the system proceeds to block 646 in which the tail activity is calculated. Otherwise, the system proceeds to block 648 and no further correction is performed. In block 646 the system calculates the tail activity using any of a variety of techniques. For example, the tail activity may be represented by the ratio of the maximum value of the trigger signal X or Y in the last half of the waveform and the overall maximum value of the trigger signal X or Y. Alternatively, the tail activity can be represented by the ratio of the sum of the squares of the last half of the waveform and the sum of the squares of the overall waveform. In the general case, the tail activity "ktail" can be represented by the following equation:

$$ktail = Etail/Etotal,$$

where Etail represents the energy in a tail portion of the waveform and Etotal represents the energy in the entire waveform. The tail portion can be defined as the last half of the waveform or any other fraction following the main pulse as will be appreciated.

Next, the system in block 650 adjusts the range value r' calculated in block 146 (FIG. 3) to account for the measured tail activity. For example, a further corrected range value r" is calculated as follows:

$$r" = r'/(1 + ktail).$$

Thus, if the measured tail activity ktail is relatively large, indicating that the lightning stroke was nearby, the range value is reduced from r' to r". As the measured tail activity ktail approaches zero, r" tends to equal r'. The system then proceeds to block 652 in the tail correction is completed.

Figure 16:
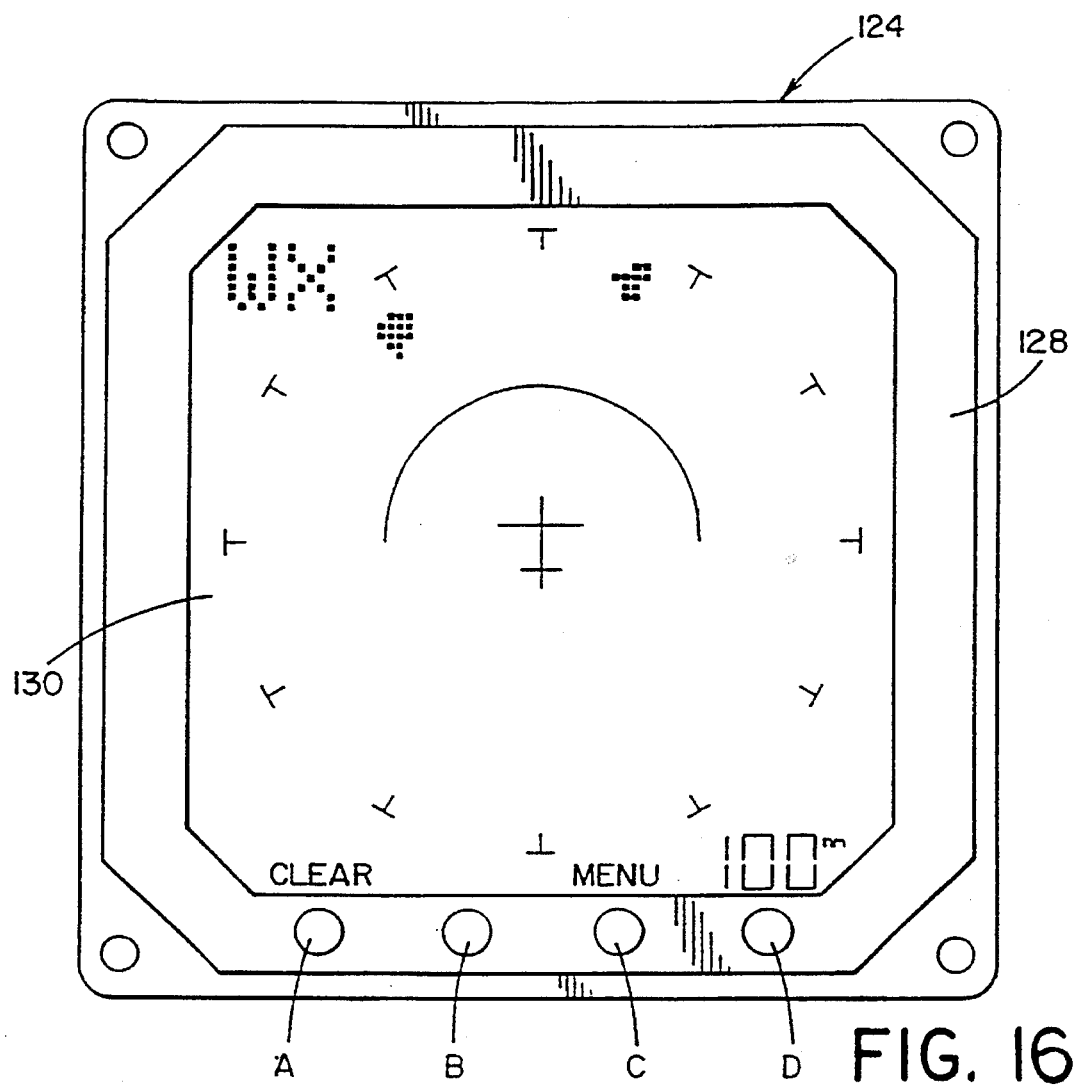
FIG. 16 is an example of a screen format display which may be generated by the software routine of FIG. 15.

Referring back to FIG. 3, the corrected range and bearing components for the lightning strike location are now ready to be displayed. FIG. 15 shows a suitable software flow chart routine for operating the microcontroller 70 in connection with the weather mode operation (also referred to herein as the lightning strike detection and mapping mode). In block 452, the range and bearing data of the detected lightning strike is received from the DSP 46 over a synchronous communication interface. Next in block 462, the range and bearing strike data is converted into the proper format, which may include the processing of a compression type algorithm, for LCD display and stored in applicable range display buffers of 25, 50 and 100 nautical miles. In block 464, a range display buffer is selected based on softkey selection. Thereafter, the selected display data is transmitted to the LCD buffer for display using the instructions of 466. FIG. 16 exemplifies the mapping of lightning strike indications on the LCD display based on the calculated locations thereof. Activation of pushbutton C transfers program execution to the menu mode as determined by decisional block 468. Also, activation of pushbutton A as determined by decisional block 470 clears the LCD and range display buffers and returns program execution to block 452 to receive the range and bearing location data of the next detected lightning strike.

Referring again to FIG. 1, yet another aspect of the present invention will be explained in relation to providing a system having extended dynamic range. As will be appreciated, it is desirable that the sensitivity of the lighting detection and mapping system be as high as possible to provide maximum range capacity. In the present invention the converter 32 samples and digitizes the X, Y and E components obtained by the antenna module 10. The dynamic range of the system is typically limited by the number of bits of resolution of the converter 32. The dynamic range of the system can be increased by increasing the number of bits of resolution of the converter 32 and by increasing the number of bits in the associated digital circuitry. However, such an increase in number of bits results in substantially higher component costs as will be appreciated.

According to a preferred embodiment of the present invention, the dynamic range of the system is increased at relatively low cost and without requiring an increase in hardware. Instead, the gain in each of the amplifiers 14, 16 and 18 which preceed the converter 32 is increased. This results in increased sensitivity of the digitized X, Y and E signals. On the other hand, there is a drawback in that strong lightning signals (i.e., high amplitude signals) emanating from nearby thunderstorms may be clipped as a result of the analog signal on line 22 exceeding the maximum value of the converter 32. In order to compensate for such clipping, the system in accordance with the present invention reconstructs any clipped portions of the respective waveforms prior to the system proceeding in block 142 of FIG. 3.

FIG. 17 provides a software flow chart suitable for programming the DSP 46 to reconstruct clipped waveforms so as to increase the overall dynamic range. Beginning in block 700, the DSP 46 determines whether the waveform has been clipped. This can be accomplished via the DSP 46 by comparing the values of the digitized signals with the maximum values of the converter. For example, the converter 32 may be an eight-bit converter having a resolution of 256 different levels centered about zero. Thus, the converter can accommodate values ranging from −127 to+127. If any of the waveform samples stored in the memory 42 equal −127 or +127, it is determined in block 700 that the waveform is clipped in the areas corresponding to such waveform samples.

In the event clipping is found in block 700, the system proceeds to block 702 in which the clipped portion (or portions) of the waveform is reconstructed. If no clipping occurs, the system proceeds directly from block 700 to block 704 whereby signal reconstruction is stopped and the system continues in block 142 of FIG. 3.

In block 702, the clipped waveform values are digitally rebuilt using properties of the sampled lightning strike signal. For example, in a preferred embodiment the clipped portions are rebuilt using a preselected linear extrapolation algorithm on the lightning strike data. The linear extrapolation algorithm is applied starting from the right edge of the clipped section of the waveform (i.e, the edge which is last in time). The slope of the linear extrapolator is determined by the two unclipped samples to the immediate right of the clipped section of the waveform.

An example of a suitable linear extrapolation algorithm for reconstructing the clipped waveform is modelled by the following:

1) Determine the sample location of the first sample to the immediate right of the clipped value(s). Denote the sample index as n and the signal value as y(n).

2) Computer a linear extrapolation slope a=y(n+1)−y(n).

3) Let M denote the number of clipped samples. For k=n−1, n−2, . . . , n−M, replace y(k) by
y(n)−(n−k) *a,
where * denotes multiplication.

Although a linear extrapolation method is used in the preferred embodiment, it will be appreciated that other extrapolation and reconstruction techniques could be used in the alternative without departing from the scope of the invention.

Figure 18:
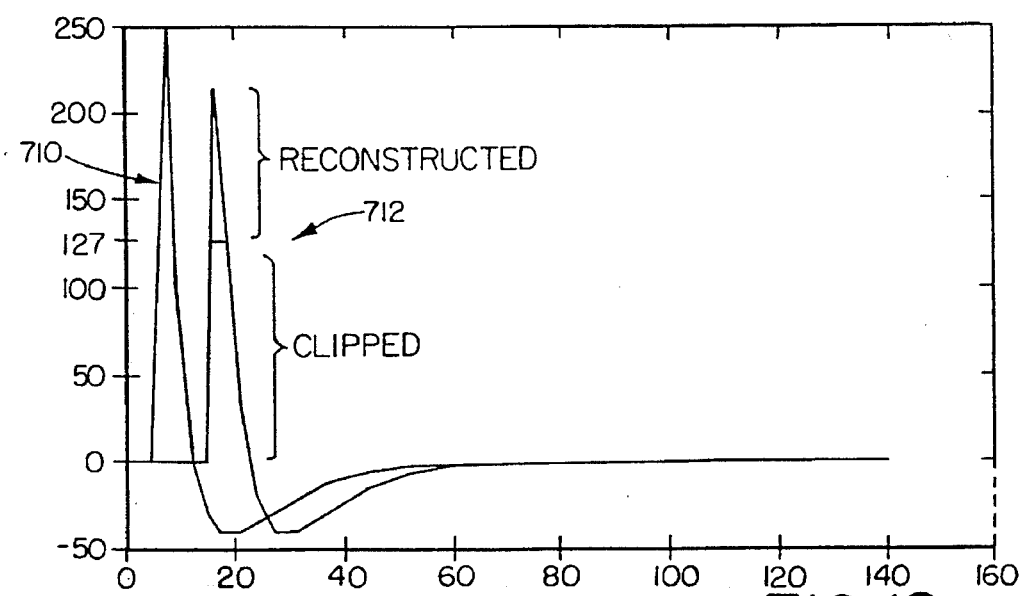
FIG. 18 is a graphical comparison of an original waveform and a reconstructed waveform in accordance with the present invention.

FIG. 18 shows a comparison between an unclipped Bruce-Golde strike waveform 710, which is a standard waveform model, and its clipped and reconstructed waveform 712. The clipped waveform is clipped at an amplitude of 127, which represents the maximum range of the A/D converter as is discussed above. The clipped waveform has been reconstructed using a linear extrapolation algorithm as modelled above. As is shown, the reconstructed waveform 712 is much closer to the original waveform 710 than the clipped waveform alone.

Studies have been conducted in relation to the range error that results from a clipped waveform and a clipped-and-reconstructed waveform as compared to the unclipped waveform. Results have shown that the lightning strike signal could be clipped to about one-fourth of its peak value, and yet the system will still maintain reliable range estimation after the reconstruction process has been applied. In this way, the dynamic range of the system is increased by a factor of four with negligible loss in range estimation accuracy. Moreover, relatively little, if any, additional hardware is required.

Referring again to FIG. 17, after the system reconstructs the clipped portions of the waveform in block 702, the system returns to block 142 in FIG. 3. The system then proceeds to process the reconstructed strike data in the same manner described above in connection with blocks 142 through 152.

In view of the above description, it will be appreciated that the lightning detection and mapping system in accordance with the present invention determines the range and bearing of each valid lightning strike with improved accuracy, speed, and range. In particular, the range and bearing of a lightning strike is determined quickly and accurately by computing the discrete Fourier Transform (DFT) of the X and Y waveforms. The lightning strike data is classified based on the DFTs, and the range of the lightning strike is determined as a function of a type-dependent weighted sum of the DFT coefficients. The DFTs can be computed quickly by use of Fast Fourier Transform algorithms. The DFT-based approach can be implemented using only a first portion of the waveform (e.g., the first 64 samples), where most of the energy is concentrated.

The system accurately identifies intracloud waveforms by detecting whether the X or Y waveform is a doublet and classifying the lightning strike based on the detection of a doublet. The system performs range correction based on the particular type classification and the tail activity within the lightning strike signal. In addition, the system offers an extended dynamic range by reconstructing clipped waveforms and processing the reconstructed waveforms.

While the foregoing provided a description of a specific embodiment, it is understood that additions, deletions or equivalent substitutions may be made thereto without deviating from the principles of the present invention. For example, the preferred embodiment is described as classifying the waveform and calculating the location of the lightning strike based on the DFTs of the detected waveform. However, other Fourier Transforms can be used in accordance with the present invention. As an example, the system may compute the discrete time Fourier Transforms (DTFTs) of the waveform and based on the DTFTs classify the waveform and calculate the location. Moreover, although the Fourier Transforms are most preferably calculated based on sampled data approximations, continuous time domain calculations using the appropriate hardware are also considered within the scope of the invention.

Accordingly the present invention should not be limited to any single embodiment, but rather construed in broad scope and breadth in accordance with the recitation of the appended claims.

What is claimed is:

1. A system for classifying detected lightning strikes, comprising:
   means for receiving a signal waveform representative of a lightning strike;
   means for sampling the received signal waveform and for digitizing said samples to generate a train of digital data samples;
   means for computing a Discrete Fourier Transform (DFT) of at least a portion of said train of digital data samples; and
   means for classifying the lightning strike represented by said signal waveform into a type based on said DFT, said means for classifying comprising means for distinguishing between different types of return stroke or intracloud stroke lightning strikes.

2. The system in accordance with claim 1, said signal waveform comprising a first part representing a main activity portion of said lightning strike and a second part representing a tail activity portion of said lightning strike, and wherein said DFT comprises a separate DFT for each of said first and second parts.

3. The system in accordance with claim 1, wherein said means for classifying comprises means for evaluating tail activity in said lightning strike based on said DFT, means for comparing said tail activity to a predetermined criteria, and means for classifying said lightning strike based on said comparison.

4. The system in accordance with claim 1, wherein said means for classifying comprises means for determining a centroid for at least a portion of said DFT, means for comparing said centroid to a predetermined criteria, and means for classifying said lighting strike based on said comparison.

5. The system in accordance with claim 1, wherein said means for classifying comprises means for classifying the lightning strike into a type selected from a plurality of predetermined types based on said DFT.

6. The system in accordance with, claim 1, wherein said means for classifying includes means for determining a pulse width of said detected signals and means for classifying the lightning strike into said type based on a combination of said DFT and said pulse width.

7. The system in accordance with claim 1, said system further comprising means for detecting whether said signal waveform is a doublet waveform, and wherein said means for classifying comprises means for classifying the lightning strike into said type based on a combination of said DFT and said doublet waveform detection.

8. A system for estimating a location of a detected lightning strike with reference to an observation location, said system comprising:
   means for receiving a signal waveform representative of a lightning strike;
   means for sampling the received signal waveform and for digitizing said samples to generate a train of digital data samples;
   means for computing a Discrete Fourier Transform (DFT) of at least a portion of said train of digital data samples; and
   means for estimating a location of the lightning strike based on said DFT.

9. The system in accordance with claim 8, wherein said means for estimating comprises means for calculating a weighted sum of a plurality of bin coefficients of said DFT.

10. The system in accordance with claim 8, further comprising:
    means for classifying the lightning strike into a type selected from a plurality of predetermined types;
    means for establishing a set of weights based on the classified type of lightning strike, the set including a weight corresponding to each of a plurality of bin coefficients in said DFT; and
    wherein said means for estimating comprises means for generating weighted sums of said plurality of bin coefficients using the established set of weights.

11. The system in accordance with claim 10, wherein said plurality of bins comprises frequency components in the approximate range of 5 kilohertz to 36 kilohertz.

12. The system in accordance with claim 8, wherein said location comprises a range estimation and a bearing estimation.

13. The system in accordance with claim 8, further comprising means for evaluating tail activity in said signal waveform and means for adjusting said estimated location based on said tail activity.

14. The system in accordance with claim 13, further comprising means for classifying the lightning strike into a type selected from a plurality of predetermined types, and wherein said means for adjusting adjusts said estimated location based on a combination of said selected type and said tail activity.

15. The system in accordance with claim 8, further comprising means for classifying the lightning strike represented by said signal waveform into a type based on said DFT.

16. A system for estimating a location of a detected lightning strike with reference to an observation location, said system comprising:
    means for receiving a signal waveform representative of a lightning strike;
    means for estimating a location of the lightning strike based on energy in said received signal waveform, said estimated location being inversely related to said energy;
    means for classifying the lightning strike into a type selected from a plurality of predetermined types based on said signal waveform; and
    means for adjusting said estimated location according to a predetermined criteria corresponding to said selected type, said predetermined criteria being based on predefined range limits associated with said classified type.

17. The system in accordance with claim 16, wherein at least one of said predetermined types is characterized by a waveform having a main pulse width of at least 25 microseconds and a frequency content concentrated at a lower end of a frequency spectrum of said signal waveform, and said predetermined criteria corresponding to said at least one predetermined type comprises a minimum range for said location.

18. The system in accordance with claim 16, wherein at least one of said predetermined types is characterized by a doublet waveform, and said predetermined criteria corresponding to said at least one predetermined type comprises a maximum range for said location.

19. The system in accordance with claim 16, wherein at least one of said predetermined types is characterized by a waveform having a main pulse with a pulse width less than 15 microseconds and a frequency center of gravity greater than 17.6 kilohertz, and said predetermined criteria corresponding to said at least one predetermined type comprises a maximum range for said location.

20. The system in accordance with claim 16, wherein said predetermined criteria corresponding to at least one of said predetermined types involves a non-linear correction function.

21. The system in accordance with claim 16, further comprising:
 means for sampling the received signal waveform and for digitizing said samples to generate a train of digital data samples;
 means for computing a Discrete Fourier Transform (DFT) of at least a portion of said train of digital data samples; and
 wherein said means for estimating estimates said location based on said DFT.

22. A system for classifying detected lightning strikes, comprising:
 means for receiving a signal waveform representative of a lightning strike;
 means for determining whether said signal waveform is a doublet waveform comprising a bipolar pulse and relatively little activity outside of said bipolar pulse; and
 means for classifying the lightning strike represented by said received signal waveform into a type based on whether said signal waveform is determined to be a doublet waveform.

23. The system in accordance with claim 22, wherein said means for determining comprises means for identifying a first pulse and a second pulse adjacent said first pulse in said waveform.

24. The system in accordance with claim 23, wherein said means for determining further comprises means for comparing a polarity and amplitude of each of said first and second pulses.

25. The system in accordance with claim 24, wherein a ratio of said amplitudes of said first and second pulses must be within the range of 0.7 to 1.6 in order for said signal waveform to be determined a doublet waveform.

26. The system in accordance with claim 23, wherein said means for determining further comprises means for evaluating whether said first and second pulses occur within a predetermined period of time.

27. The system in accordance with claim 26, wherein said predetermined time is no greater than approximately 12 microseconds.

28. The system in accordance with claim 23, wherein said means for determining further comprises means for comparing energy in said waveform in an area including said first and second pulses with energy in said waveform in another area not including said first and second pulses.

29. The system in accordance with claim 28, a ratio of said energy of said another area and said energy of said area must be no greater than approximately 0.3 in order for said signal waveform to be determined a doublet waveform.

30. The system in accordance with claim 22, wherein said type is associated with intracloud activity.

31. A system for estimating a location of a detected lightning strike with reference to an observation location, said system comprising:
 means for receiving a signal waveform representative of a lightning strike;
 means for determining whether said signal waveform is a doublet waveform comprising a bipolar pulse having a first pulse and a second pulse adjacent to said first pulse and relatively little activity outside of said bipolar pulse, an amplitude of said first pulse being generally comparable to an amplitude of said second pulse; and
 means for estimating a location of the lightning strike based on whether said signal waveform is determined to be a doublet waveform.

32. The system in accordance with claim 31, wherein said means for determining comprises means for identifying said first pulse and said second pulse adjacent said first pulse in said waveform.

33. The system in accordance with claim 32, wherein said means for determining further comprises means for comparing a polarity and amplitude of each of said first and second pulses.

34. The system in accordance with claim 33, wherein a ratio of said amplitudes of said first and second pulses must be within the range of 0.7 to 1.6 in order for said signal waveform to be determined a doublet waveform.

35. The system in accordance with claim 32, wherein said means for determining further comprises means for evaluating whether said first and second pulses occur within a predetermined period of time.

36. The system in accordance with claim 35, wherein said predetermined time is no greater than approximately 12 microseconds.

37. The system in accordance with claim 32, wherein said means for determining further comprises means for comparing energy in said waveform in an area including said first and second pulses with energy in said waveform in another area not including said first and second pulses.

38. The system in accordance with claim 37, a ratio of said energy of said another area and said energy of said area must be no greater than approximately 0.3 in order for said signal waveform to be determined a doublet waveform.

39. A system for estimating a location of a detected lightning strike with reference to an observation location, said system comprising:
 means for receiving a signal waveform representative of a lightning strike, said signal waveform having a main portion followed in time by a tail portion;
 means for comparing an amount of energy in said tail portion with an amount of energy in said main portion; and
 means for estimating a location of the lightning strike based on said comparison of said energy in said tail portion with said energy in said main portion.

40. The system in accordance with claim 39, wherein said means for comparing comprises means for comparing a maximum value of said waveform in said tail portion with a maximum value in said signal waveform.

41. The system in accordance with claim 39, said system further including means for sampling the received signal waveform and for digitizing said samples to generate a train of digital data samples; and wherein said means for comparing comprises means for comparing a sum of squares of said digital data samples corresponding to said tail portion with a sum of squares of said digital data samples corresponding to said signal waveform.

42. The system in accordance with claim 39, said system further comprising means for classifying the lightning strike into a type selected from a plurality of predetermined types based on said signal waveform, and wherein said means for estimating estimates said location based on a combination of said comparison and said classified type.

43. The system in accordance with claim 39, wherein said means for estimating comprises means for computing a discrete Fourier Transform (DFT) of said signal waveform to determine a range of said lightning strike.

44. A system for classifying detected lightning strikes, comprising:

means for receiving a signal waveform representative of a lightning strike;

means for identifying a portion of said received signal waveform which has undergone clipping;

means for reconstructing said portion of said signal waveform; and means for classifying the lightning strike represented by said received signal waveform into a type based on said reconstructed portion.

45. The system in accordance with claim 44, wherein said means for receiving comprises an analog-to-digital converter and said clipping occurs as a result of limitations in the performance of said analog-to-digital converter.

46. The system in accordance with claim 45, wherein said means for reconstructing comprises means for performing linear extrapolation.

47. A system for estimating a location of a detected lightning strike with reference to an observation location, said system comprising:

means for receiving a signal waveform representative of a lightning strike;

means for identifying a portion of said received signal waveform which has undergone clipping;

means for reconstructing said portion of said signal waveform; and means for estimating a location of the lightning strike based on said reconstructed portion.

48. The system in accordance with claim 47, wherein said means for receiving comprises an analog-to-digital converter and said clipping occurs as a result of limitations in the performance of said analog-to-digital converter.

49. The system in accordance with claim 48, wherein said means for reconstructing comprises means for performing linear extrapolation.

50. A system for classifying detected lightning strikes, comprising:

means for receiving a signal waveform representative of a lightning strike;

means for computing a Fourier Transform (FT) of at least a portion of said signal waveform; and means for classifying the lightning strike represented by said signal waveform into a type based on said FT, said means for classifying comprising means for distinguishing between different types of return stroke or intracloud stroke lightning strikes.

51. A system for estimating a location of a detected lightning strike with reference to an observation location, said system comprising:

means for receiving a signal waveform representative of a lightning strike;

means for computing a Fourier Transform (FT) of at least a portion of said signal waveform; and means for estimating a location of the lightning strike based on said FT.

52. The system in accordance with claim 8, wherein said means for estimating comprises:

means for discriminating between different types of return stroke or intracloud stroke lightning strikes based on said DFT; and means for determining the location of the lightning strike as a function of said discrimination between different types.

53. The system in accordance with claim 51, wherein said means for estimating comprises:

means for discriminating between different types of return stroke or intracloud stroke lightning strikes based on said FT; and means for determining the location of the lightning strike as a function of said discrimination between different types.

* * * * *